US008142275B2

(12) United States Patent
Teranishi

(10) Patent No.: US 8,142,275 B2
(45) Date of Patent: Mar. 27, 2012

(54) GAMING MACHINE FOR PROVIDING AN ADDITIONAL PAYOUT AMOUNT BASED ON A SELECTED AREA PATTERN

(75) Inventor: Tatsuya Teranishi, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 763 days.

(21) Appl. No.: 12/249,442

(22) Filed: Oct. 10, 2008

(65) Prior Publication Data

US 2009/0227336 A1 Sep. 10, 2009

Related U.S. Application Data

(60) Provisional application No. 61/033,534, filed on Mar. 4, 2008.

(51) Int. Cl.
*G06F 17/00* (2006.01)
*G06F 19/00* (2011.01)

(52) U.S. Cl. ............................... 463/20; 463/16; 463/25

(58) Field of Classification Search ............. 463/16–20, 463/25, 29
See application file for complete search history.

(56) References Cited

U.S. PATENT DOCUMENTS

| | | | | |
|---|---|---|---|---|
| 6,319,124 | B1 * | 11/2001 | Baerlocher et al. | 463/20 |
| 6,648,758 | B2 | 11/2003 | Bennett et al. | |
| 7,192,347 | B1 * | 3/2007 | Marks et al. | 463/20 |
| 7,686,686 | B2 * | 3/2010 | Marks et al. | 463/20 |
| 2002/0086725 | A1 * | 7/2002 | Fasbender et al. | 463/11 |
| 2002/0177478 | A1 * | 11/2002 | Glasson et al. | 463/19 |
| 2004/0192431 | A1 * | 9/2004 | Singer et al. | 463/20 |
| 2004/0266509 | A1 * | 12/2004 | Bennett et al. | 463/16 |
| 2008/0076518 | A1 * | 3/2008 | Yoshizawa | 463/20 |
| 2011/0165934 | A1 * | 7/2011 | Marks et al. | 463/20 |

* cited by examiner

*Primary Examiner* — Milap Shah
(74) *Attorney, Agent, or Firm* — NDQ&M Watchstone LLP

(57) ABSTRACT

A game environment will be described. A specific area is selectable and if a specific symbol (for example, COFFIN symbol) is stopped on the selected specific area in a free game, image effect is made and additional payout amount is provided based on the number of stopped specific symbols and additional amount.

6 Claims, 30 Drawing Sheets

*(COFFIN symbol is stopped on selected area)*

*(DRACULA appears)*

*(Image effects and Additional payout occur)*

FIG. 8

| |
|---|
| : |
| K |
| J |
| CASTLE |
| GARLIC |
| GARLIC |
| 10 |
| COFFIN |
| K |
| J |
| K |
| DRACULA |
| A |
| Q |
| 10 |
| Q |
| BAT |
| A |
| Q |
| Q |
| K |
| DRACULA |
| BAT |
| : |

FIG. 11

| | of a Kind | | | | | | | | | | | | |
|---|---|---|---|---|---|---|---|---|---|---|---|---|---|
| | 3 | 4 | 5 | 6 | 7 | 8 | 9 | 10 | 11 | 12 | 13 | 14 | 15 |
| K | 30 | 40 | 50 | 60 | 70 | 80 | 90 | 100 | 110 | 120 | 130 | 140 | 150 |
| Q | 30 | 40 | 50 | 60 | 70 | 80 | 90 | 100 | 110 | 120 | 130 | 140 | 150 |
| J | 30 | 40 | 50 | 60 | 70 | 80 | 90 | 100 | 110 | 120 | 130 | 140 | 150 |
| A | 30 | 40 | 50 | 60 | 70 | 80 | 90 | 100 | 110 | 120 | 130 | 140 | 150 |
| 10 | 30 | 40 | 50 | 60 | 70 | 80 | 90 | 100 | 110 | 120 | 130 | 140 | 150 |
| BAT | 60 | 80 | 100 | 120 | 140 | 160 | 180 | 200 | 220 | 240 | 260 | 280 | 300 |
| GARLIC | 60 | 80 | 100 | 120 | 140 | 160 | 180 | 200 | 220 | 240 | 260 | 280 | 300 |
| CASTLE | 75 | 100 | 125 | 150 | 175 | 200 | 225 | 250 | 275 | 300 | 325 | 350 | 375 |
| BEAUTY | 90 | 120 | 150 | 180 | 210 | 240 | 270 | 300 | 330 | 360 | 390 | 420 | 450 |
| COFFIN | 60 | 80 | 100 | 120 | 140 | 160 | 180 | 200 | 220 | 240 | 260 | 280 | 300 |
| DRACULA | 60 | 80 | 100 | 120 | 140 | 160 | 180 | 200 | 220 | 240 | 260 | 280 | 300 |

FIG. 14

| REEL | |
|---|---|
| CODE NUMBER | SYMBOL |
| : | : |
| 03 | K |
| 04 | J |
| 05 | CASTLE |
| 06 | GARLIC |
| 07 | GARLIC |
| 08 | 10 |
| 09 | COFFIN |
| 10 | K |
| 11 | J |
| 12 | K |
| 13 | DRACULA |
| 14 | A |
| 15 | Q |
| 16 | 10 |
| 17 | Q |
| 18 | BAT |
| : | : |

FIG. 15

| RANDOM NUMBER VALUE | CODE NUMBER |
|---|---|
| : | : |
| 384~511 | 03 |
| 512~760 | 04 |
| 761~767 | 05 |
| 768~895 | 06 |
| 896~1023 | 07 |
| 1024~1151 | 08 |
| 1152~1279 | 09 |
| 1280~1307 | 10 |
| 1308~1335 | 11 |
| 1336~1364 | 12 |
| 1365~1491 | 13 |
| 1492~1919 | 14 |
| 1920~2047 | 15 |
| 2048~2175 | 16 |
| 2176~2302 | 17 |
| 2303~2429 | 18 |
| : | : |

FIG. 16

| RANDOM NUMBER VALUE | SYMBOL |
|---|---|
| : | : |
| 384~511 | K |
| 512~760 | J |
| 761~767 | CASTLE |
| 768~895 | GARLIC |
| 896~1023 | GARLIC |
| 1024~1151 | 10 |
| 1152~1279 | COFFIN |
| 1280~1307 | K |
| 1308~1335 | J |
| 1336~1364 | K |
| 1365~1491 | DRACULA |
| 1492~1919 | A |
| 1920~2047 | Q |
| 2048~2175 | 10 |
| 2176~2302 | Q |
| 2303~2429 | BAT |
| : | : |

additional payout
does not occur

GAMING MACHINE FOR PROVIDING AN ADDITIONAL PAYOUT AMOUNT BASED ON A SELECTED AREA PATTERN

CROSS-REFERENCE TO RELATED APPLICATIONS

This application is based upon and claims a priority from the U.S. Provisional Patent Application No. 61/033,534 filed on Mar. 4, 2008, the entire contents thereof are incorporated herein by reference for all purposes.

BACKGROUND

1. Field

One or more aspects of invention relate to a gaming machine in which specific area is selectable and if a specific symbol is stopped on the selected specific area in a free game, additional payout amount is provided based on the number of stopped specific symbols and additional amount.

2. Description of Related Art

To enhance entertainment aspects, there are gaming machines which changes payout amount corresponding to a winning combination made up of plural symbols in a free game. In the conventional gaming machine, since the winning combination is made up of the plural symbols, it is necessary to realize the winning combination to obtain the payout amount. Also, to attract players, a gaming machine which has new feature is anticipated.

SUMMARY

In view of the foregoing, one or more aspects of the present invention relate to a gaming machine, a gaming method thereof, a computer readable medium having computer-executable instructions or the like in which a new gaming environment.

A gaming machine related to one or more aspect of the invention comprises a display, use interface elements, and a processor. The display has symbol display areas displaying symbols. The user interface elements accept an input from a user. The processor controls display contents of the display and sessions of a first game and a second game. The processor displays a selection screen on the display if a predetermined number or more of the first symbols are displayed in the first game, selects one or more areas from among the plural symbol display portions based on input information from the user interface elements, executes the second games predetermined times, determines additional payout amount based a number of the second symbols displayed on the selected areas and additional amount, and provides the determined additional payout amount.

Herewith, since the player can select specific areas, the entertainment aspect is enhanced and it can attract players.

A gaming machine related to one or more aspect of the invention comprises a display, use interface elements, and a processor. The display has symbol display areas displaying symbols. The user interface elements accept an input from a user. The processor controls display contents of the display and sessions of a first game and a second game. The processor displays a selection screen on the display if a predetermined number or more of the first symbols are displayed in the first game, selects one or more areas from among the plural symbol display portions based on input information from the user interface elements, executes the second games predetermined times, determines additional amount from a predetermined additional amount group by lottery every the second game, determines additional payout amount based a number of the second symbols displayed on the selected areas and the determined additional amount, and provides the determined additional payout amount.

Herewith, since the player can select specific areas and additional amount can be changed every the second game, the entertainment aspect is enhanced and it can attract players.

A gaming machine related to one or more aspect of the invention comprises a display, use interface elements, and a processor. The display has symbol display areas displaying symbols. The user interface elements accept an input from a user. The processor controls display contents of the display and sessions of a first game and a second game. The processor displays a selection screen on the display if a predetermined number or more of the first symbols are displayed in the first game, selects one or more areas from among the plural symbol display portions based on input information from the user interface elements, determines one additional amount group from plural additional amount groups based on a number of selected symbol display areas, executes the second games predetermined times, determines additional amount from the selected predetermined additional amount group by lottery every the second game, determines additional payout amount based a number of the second symbols displayed on the selected areas and the determined additional amount, and provides the determined additional payout amount.

Herewith, since the player can select specific areas and additional amount can be changed every the second game further the additional amount group is changed based on the number selected symbol display areas, the entertainment aspect is enhanced and it can attract players.

One or more of the above aspects of the invention will be more fully described in the following detailed description when read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

FIG. 8 is a view showing symbol rows displayed on each reel of the slot machine in accordance with one or more aspects of the invention.

FIG. 11 is a view showing contents of payout table of the slot machine in accordance with one or more aspects of the invention.

FIG. 14 is a view showing a table in which each of code numbers corresponds to symbol in the slot machine in accordance with one or more aspects of the invention.

FIG. 15 is a view showing a table in which random number values correspond to code number in the slot machine in accordance with one or more aspects of the invention.

FIG. 16 is a view showing a table in which random number values correspond to symbol in the slot machine in accordance with one or more aspects of the invention.

DETAILED DESCRIPTION

Figure 1:
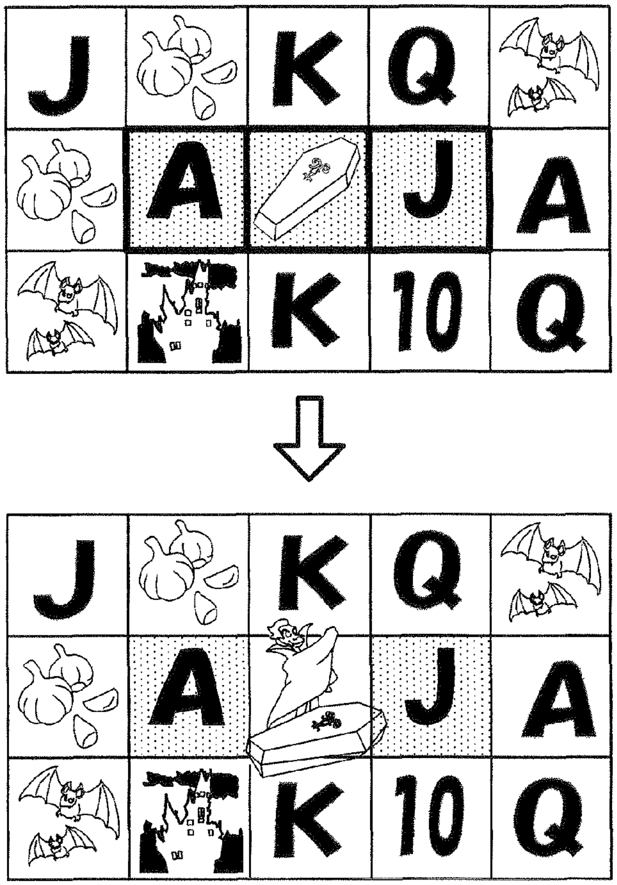
FIG. 1 is a view showing an example of display content of symbol display portions in accordance with one or more aspects of the invention.
Figure 1:
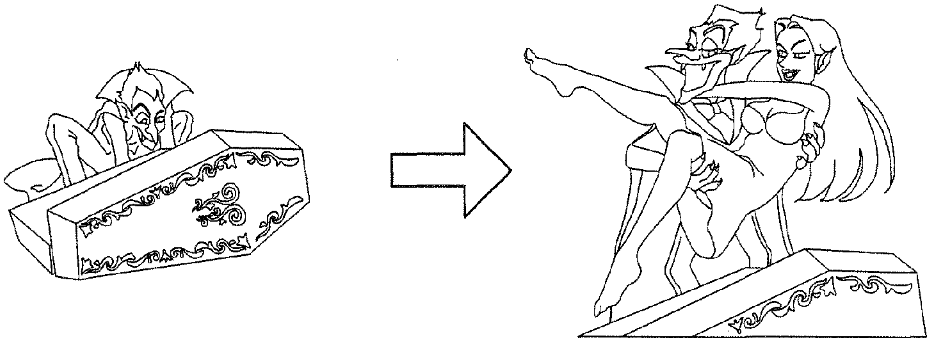

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

A gaming machine, a server, and a game system according to one or more aspects of the invention will be described in detail with reference to the drawings based on an embodiment embodying one or more aspects of the invention. However, it is appreciated that one or more aspects of the invention may be embodied in distributable (via CD and the like) or downloadable software games, console games, and the like. In this regard, the slot machine may be a virtual slot machine that is displayed on a multi-purpose computer and/or dedicated kiosk. Aspects of the invention are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the invention may be embodied in a JAVA-based application or the like that runs in a processor or processors. Further, the terms “CPU”, “processor”, and “controller” are inclusive by nature, including at least one of hardware, software, or firmware. These terms may include a portion of a processing unit in a computer (for instance, in multiple core processing units), multiple cores, a functional processor (as running virtually on at least one of processor or server, which may be local or remote). Further, in network-based gaming systems, the processor may include only a local processor, only a remote server, or a combination of a local processor and a remote server.

It is contemplated that one or more aspects of the invention may be implemented as computer executable instructions on a computer readable medium such as a non-volatile memory, a magnetic or optical disc. Further, one or more aspects of the invention may be implemented with a carrier signal in the form of, for instance, an audio-frequency, radio-frequency, or optical carrier wave.

First Embodiment

A gaming machine related to one or more aspects of the invention will be described in detail with reference to drawings based on a first embodiment embodying a slot machine.

The slot machine 1 of the embodiment has an image display device such as a liquid crystal display for example, and executes games by displaying images of various symbols on the image display device. That is, the slot machine 1 of the embodiment can be implemented as a video slot machine.

Also, the slot machine 1 of the embodiment can be implemented as a hybrid type slot machine made up of mechanical reels and transparent liquid crystal display device arranged in front of the mechanical reels.

Also, the slot machine 1 of the embodiment can be implemented as a mechanical slot machine having mechanical reels.

Here, in following explanation, slot machines using video reels are mainly described, however, naturally, one or more aspects of the invention is can be applied to slot machines using mechanical reels within applicable limits.

In the slot machine of the embodiment, specific area is selectable and if a specific symbol (for example, COFFIN symbol) is stopped on the selected specific area in a free game, image effect is made and additional payout amount is provided based on the number of stopped specific symbols and additional amount (see FIG. 1).

Figure 2:
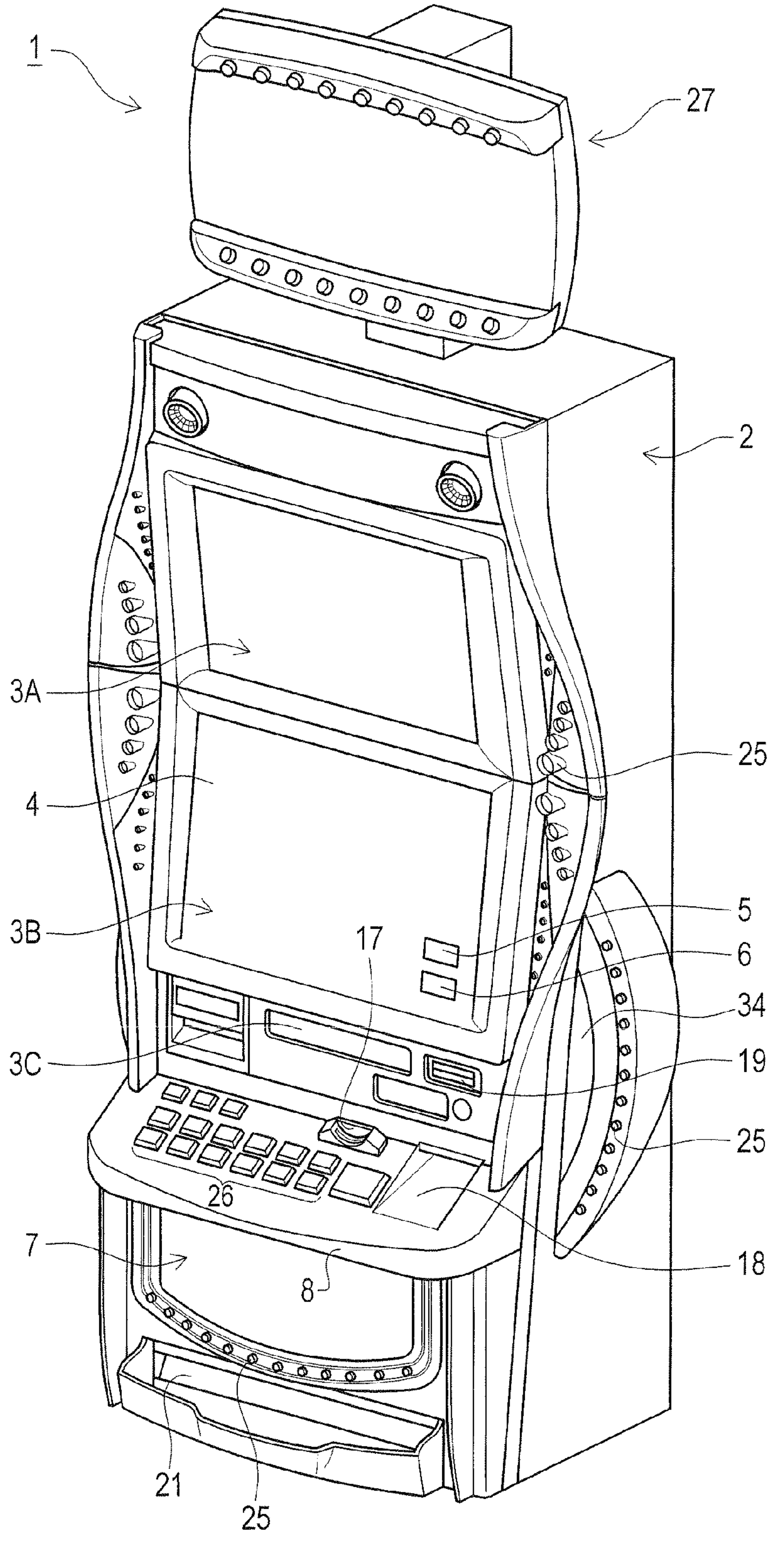
FIG. 2 is a view showing an outline of a slot machine in accordance with one or more aspects of the invention.

At first, a schematic configuration of a slot machine 1 according to the embodiment will be described with reference to FIG. 2. FIG. 2 is a perspective view showing an outer appearance of the slot machine 1 according to the embodiment.

The slot machine 1 according to the embodiment is an upright-type slot machine positioned in a gaming arcade such as a casino or the like. Here, the outer shape of the slot machine 1 of the embodiment shown in FIG. 2 is given as merely one example, and one or more aspects of the invention is not limited to this outer shape.

The slot machine 1 has a cabinet 2. The cabinet 2 is a housing portion that houses electrical or mechanical components which are used in execution of a predetermined game aspect.

An upper display portion 3A, a main display portion 3B, and an under display portion 3C are arranged in front of the slot machine 1 so as to display different type of game information. The upper display portion 3A is arranged upper side of the cabinet 2, the main display portion 3B is arranged middle side of the cabinet 2, and the under display portion 3C is arranged lower side of the cabinet 2.

The upper display portion 3A is constructed from a liquid crystal panel. Effects images, payout tables of games, game rules, or the like are displayed on the upper display portion 3A.

Figure 3:
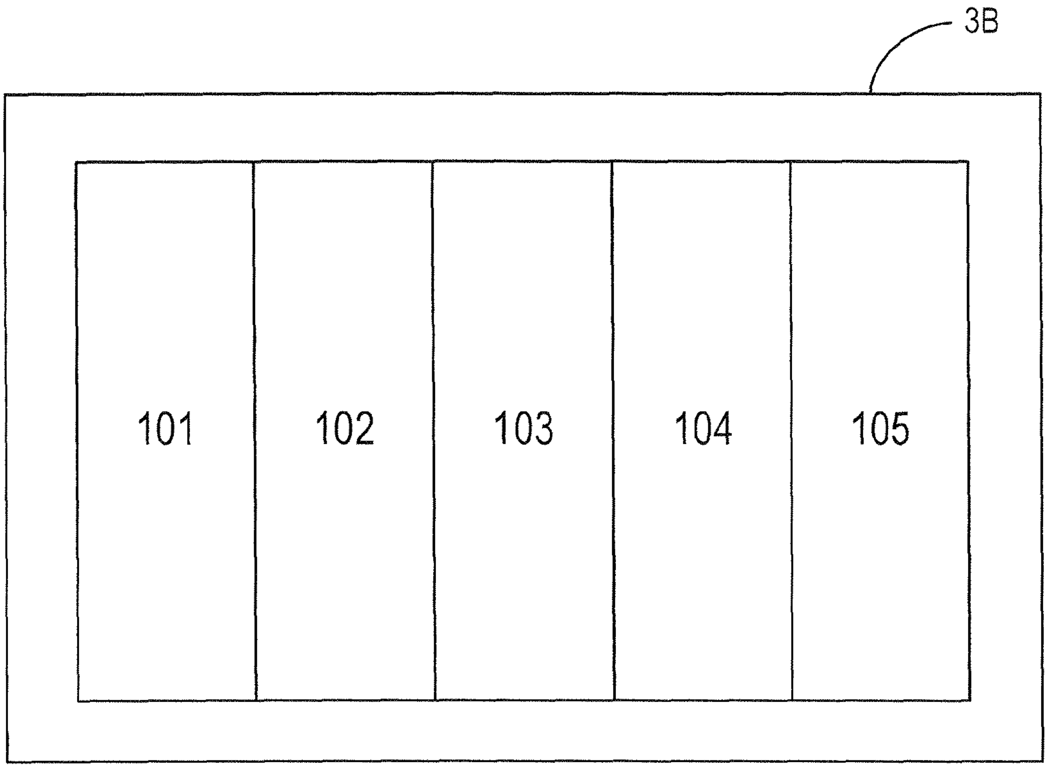
FIG. 3 is a view showing the reel display portions of the slot machine in accordance with one or more aspects of the invention.
Figure 4:
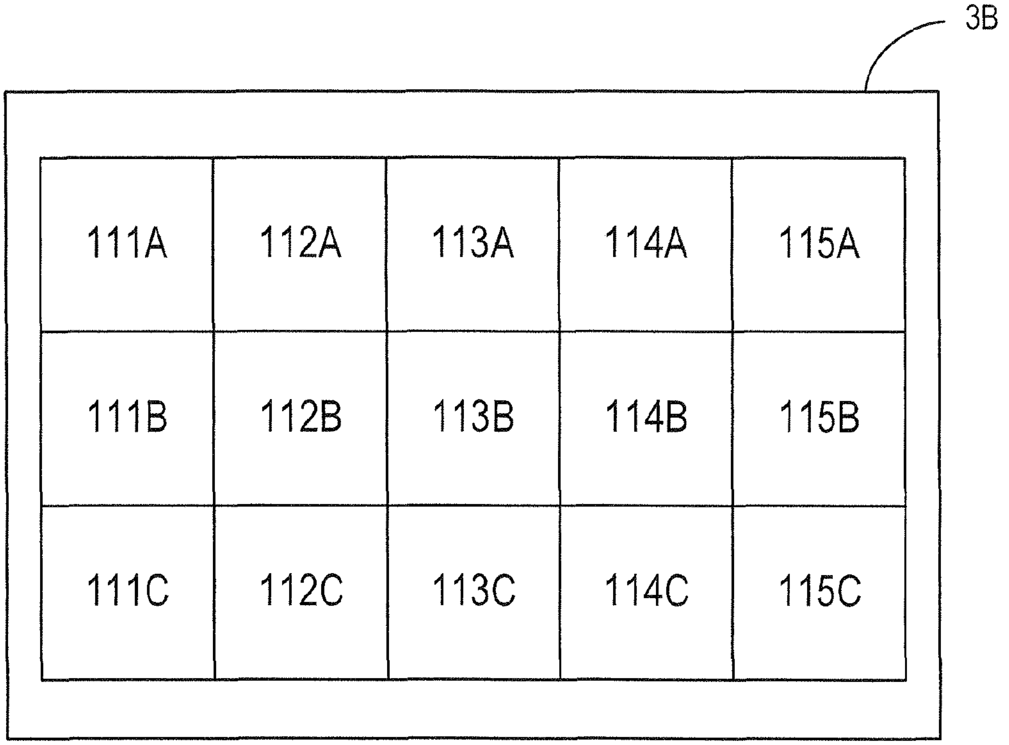
FIG. 4 is a view showing the symbol display portions of the slot machine in accordance with one or more aspects of the invention.

The main display portion 3B is constructed from a liquid crystal panel. For example, as shown in FIG. 3, the main display portion 3B has five of reel display potions 101 through 105. A symbol row is variably displayed and stopped on each of the reel display portions. Three of symbols are displayed on each of the reel display portions 101 through 105. That is, as shown in FIG. 4, symbols are displayed on the main display portion 3B in 3×5 matrix shape. Also, the reel display portions 101 through 105 have symbol display portions 111A to 111C, 112A to 112C, 113A to 113C, 114A to 114C, and 115A to 115C. Here, the number of the reels and the number of displayed symbols per one reel display portion are variable.

A touch panel 4 is provided at a front face of the main display portion 3B. The player can operate the touch panel 4 to input various types of commands. Also, a payout number display portion 5 and a credit number display portion 6 are arranged on the main display portion 3B. The displayed position of the payout number display portion 5 and the credit number display portion 6 are variable. For example, these are displayed on lower right side portion of the main display portion 3B. Also, a bet number display portion may be arranged so as to display bet number. The payout number which will be provided to the player (that is, payout number to be provided when predetermined symbols are displayed with the predetermined number in a game or a base game and accumulated payout number obtained in free games) are displayed on the payout number display portion 5. The credit number which the player currently owns is displayed on the credit number display portion 6.

The under display portion 3C is constructed from a liquid crystal panel. Number of points stored in a card and/or number of game points are displayed on the under display portion 3C. Also, when the card is not inserted and/or error of reading the card occurs, message which indicates that is displayed.

Also, a card reader 19 is arranged around the under display portion 3C. The card reader 19 can read information from the card in which the player owns.

The upper display portion 3A, the main display portion 3B, and the under display portion 3C are constructed from the liquid display for example, however, one or more aspects of the invention is not so limited. That is, each of the main display portions can be CRT displays, plasma displays, LED displays, or other known display devices.

A lower back panel 7 is arranged lower side of the under display portion 3C and is constructed from plastic panel. Character pictures related to the gaming machine, name of the gaming machine, and the like are displayed and the lower back panel is lit by the backlight. The lower back panel 7 can be CRT displays, plasma displays, LED displays, or other known display devices.

Also, the main display portion 3B can be hybrid type slot machine which is made up of mechanical reels and transparent liquid crystal display device arranged in front of the mechanical reels. In this case, symbols displayed on the mechanical reels are visible perceived via the transparent liquid crystal display device. Also, it is preferable that display windows whose number is the same as the number of the mechanical reels is arranged on the transparent liquid crystal display device and it is constructed so that symbols displayed on the mechanical reels are visible perceived via the window displays. Here, in following explanation, slot machines using video reels are mainly described, however, naturally, one or more aspects of the invention is can be applied to slot machines using mechanical reels within applicable limits. Also, if the mechanical reels are used, the mechanical reels are spin and stopped by motors which are not shown.

An operation table 8 formed by projecting to proximal side is provided at the bottom of the main display portion 3B. Various operation buttons 26, such as an exchange button, a payout button, a help button, a bet button, and start button or the like, are arranged on the operation table 8. An arrangement of these buttons is variable. Also, a part of the buttons can be omitted, and new button can be added or replaced, as needed. Also, a coin insertion slot 17 and a bill verifier 18 are arranged on the operation table 8.

Also, a coin payout opening and a coin receiving portion 21 is formed on lower portion of the cabinet 2. The coin payout opening is a portion where coins are paid out based on inputs of the exchange button or the payout button. And, the coin receiving portion 21 is a portion where the coins which are paid out from the coin payout opening are received. A coin detection portion made up of sensor or the like is arranged inside the coin payout opening. The coin detection portion detects the number of coins which are paid out from the payout opening.

Further, light emitting portions 25, which lights up in a predetermined lighting pattern when winning combination is realized and during the free game, are arranged around the cabinet 2 of the slot machine 1. Loudspeakers 34 which outputs audio are arranged at side of the cabinet 2. Here, arranged positions of the light emitting portion 25 and the loudspeaker 34 are variable.

The slot machine 1 has a topper effect device 27 provided at an upper side of the cabinet 2. This topper effect device 27 has a rectangular board shape and is arranged so as to be substantially parallel with the upper display portion 3A. Here, the shape of the topper effect device 27 is variable. Different types of information are displayed on the topper effect device 27.

Figure 5:
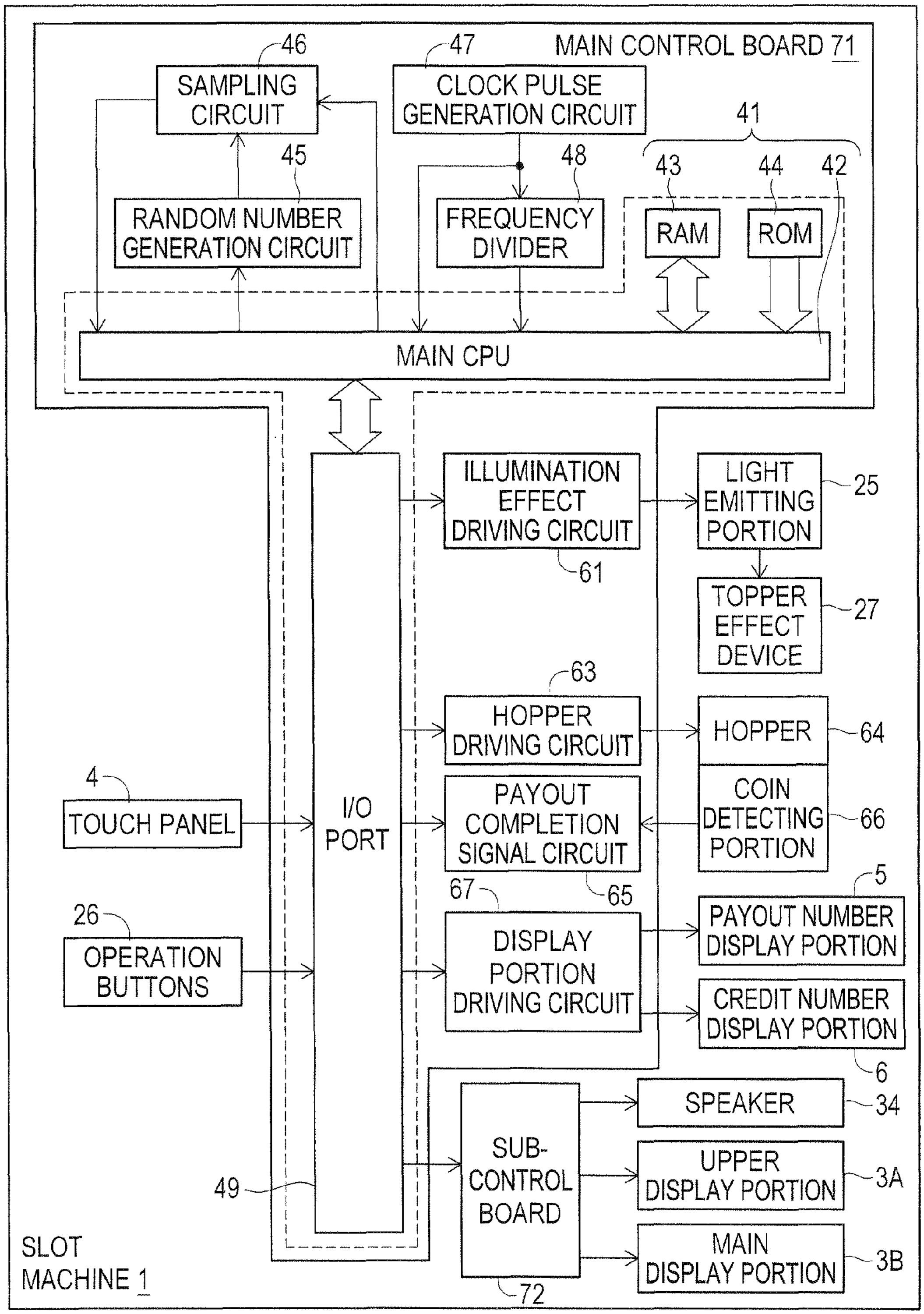
FIG. 5 is a block diagram showing an internal configuration of the slot machine in accordance with one or more aspects of the invention.
Figure 6:
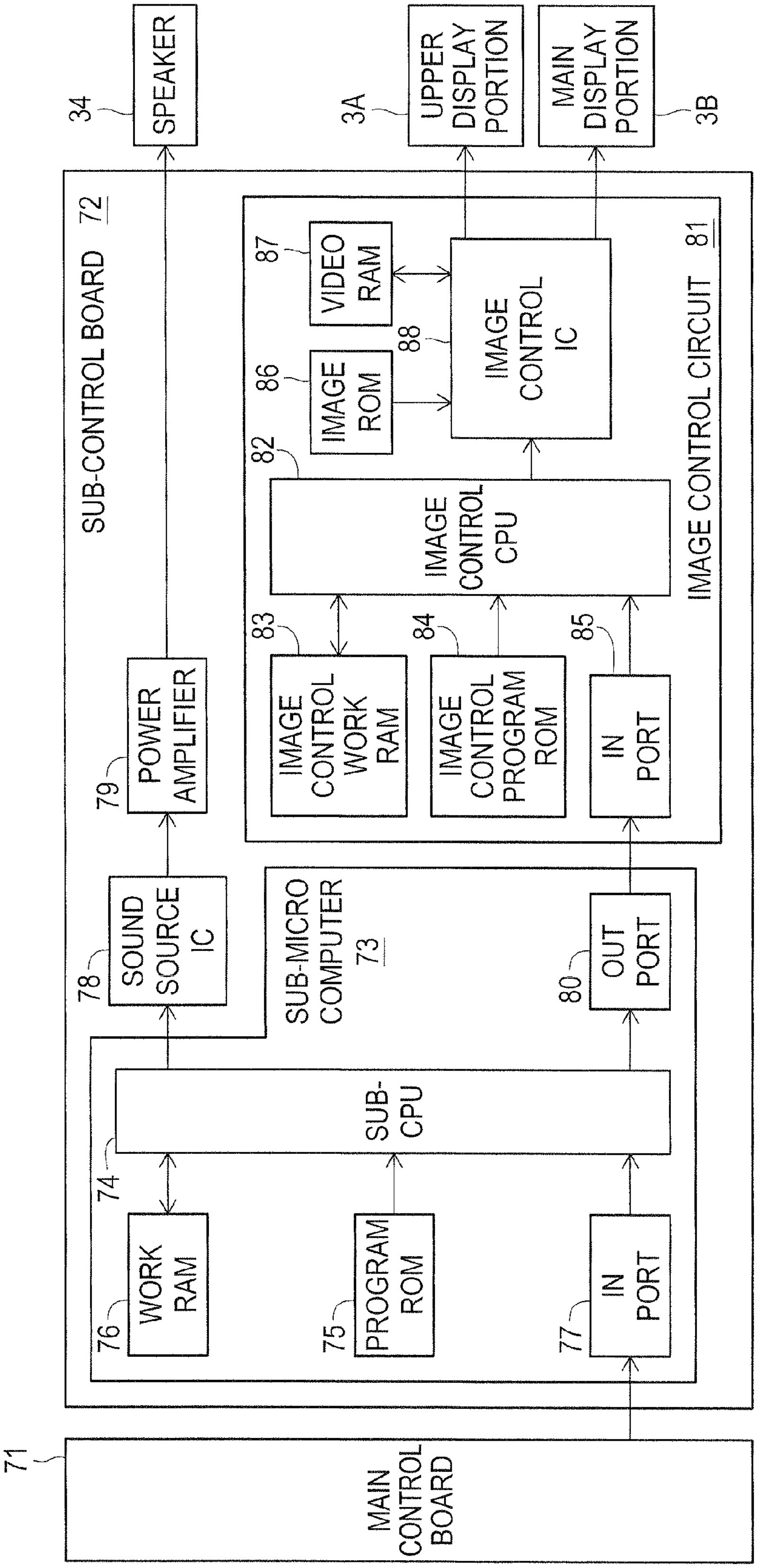
FIG. 6 is a block diagram showing an internal configuration of a sub-control board of the slot machine in accordance with one or more aspects of the invention.

Next, the internal configuration of the above-mentioned slot machine 1 will be described with reference to FIG. 5 and FIG. 6. FIG. 5 is a block diagram showing an internal configuration of the entire slot machine 1. As shown in FIG. 5, the slot machine 1 has a plurality of constituent elements arranged around a main control board 71 including a controller 41 that executes control programs that will be described later. The main control board 71 has a controller 41, a random number generation circuit 45, a sampling circuit 46, a clock pulse generation circuit 47, a divider 48, an illumination effect driving circuit 61, a hopper driving circuit 63, a payout completion signal circuit 65 and a display portion driving circuit 67.

The controller 41 has a main CPU 42, a RAM 43 and a ROM 44. The main CPU 42 operates in accordance with the programs stored in the ROM 44 and performs signal input and output with respect to the other constituent elements through an I/O port 49. Specifically, the main CPU 42 controls the operation of the entire slot machine 1. The RAM 43 stores data and programs to be used when the main CPU 42 is operating. For instance, the RAM 43 temporarily retains the random number values which have been sampled by the sampling circuit 46 after the game has started. The RAM 43 stores code numbers which will be described later.

The ROM 44 programs that will be executed by the main CPU 42, as well as permanent data.

More particularly, the programs stored in the ROM 44 include game programs and game system programs (hereinafter referred to as game programs or the like). Further, the game programs include lottery programs as will be described later.

Also, in a case where the slot machine of the embodiment is implemented as the video machine, symbol images constructing the video reel are stored in the ROM 44.

The lottery programs are used to determine the code numbers corresponding to symbols to be displayed on center positions of each reel display portions 101 to 105, namely, symbol display portion 111B, 112B, 113B, 114B, and 115B of the main display portion 3B. A correspondence relationship between code numbers and symbols will be described later.

The random number generation circuit 45 operates in accordance with the commands from the main CPU 42 and generates random numbers within a predetermined range. The sampling circuit 46 selects, by lottery, an arbitrary random number from the random numbers generated by the random number generation circuit 45 in response to a command from the main CPU 42. At the same time, the sampling circuit 46 inputs the random number thus selected to the main CPU 42. The clock pulse generation circuit 47 generates a reference clock for causing the main CPU 42 to operate. The divider 48 inputs a signal obtained by dividing the reference clock by a constant frequency to the main CPU 42.

Further, the main control board 71 is connected to the touch panel 4. As described above, the touch panel 4 is arranged at a front face of the main display portion 3B and is adapted to identify a coordinate position of the portion that was touched by the player. Specifically, the touch panel 4 can discriminate the portion that the player has touched, and in what direction the touched portion was moved based on the coordinate position information that was thus identified. A signal in accordance with the above discrimination is then inputted to the main CPU 42 through the I/O port 49.

Further, the main control board 71 is connected to the operation button 26 (the start button and the like, as mentioned above) and a signal in accordance with a depression operation of these buttons is inputted to the main CPU 42 through the I/O port 49.

The illumination effect driving circuit 61 outputs an effect signal for causing the light emitting portions 25 and the topper effect device 27 as mentioned above to perform illumination effects. The topper effect device 27 is connected in series with the illumination effect driving circuit 61 through the light emitting portions 25.

The hopper driving circuit 63 drives the hopper 64 under the control of the main CPU 42. As a result, the hopper 64 carries out an operation to payout coins to the coin payout opening. The payout completion signal circuit 65 receives coin amount value data from the coin detecting portion 24 to which it is connected. Then, when the received coin amount value has reached the set coin amount value, the payout completion signal circuit 65 inputs a signal that notifies completion of coin payout to the main CPU 42. The coin detecting portion 24 detects the number of coins that were paid out by the hopper 64 and then inputs coin amount value data showing the amount of coins that was detected to the payout completion signal circuit 65. The display portion driving circuit 67 controls the display operation of the respective display portions including the payout number display portion 5, the credit number display portion 6, and the like.

Further, the main control board 71 is connected to the sub-control board 72. As shown in FIG. 6, the sub-control board 72 carries out display control of each of the display portion and output control of the audio outputted by the loudspeaker 34, based on the commands received from the main control board 71. This sub-control board 72 is constituted on a separate circuit board from the circuit board that constitutes the main control board 71. The sub-control board 72 has a micro computer (hereinafter referred to as "sub-micro computer") 73 which is provided as a main constituting element. Then, the sub-control board 72 has a sound source IC 78, a power amplifier 79, and an image control circuit 81. The sound source IC 78 controls the audio output from the loudspeaker 34. The power amplifier 79 functions as an amplifier. The image control circuit 81 operates as a display control section for the upper display portion 3A and the main display portion 3B.

The sub-micro computer 73 has a sub-CPU 74, a program ROM 75, a work RAM 76 and I/O ports 77 and 80. The sub-CPU 74 carries out a control operation in accordance with a control command transmitted from the main control board 71. Although the sub-control board 72 does not have a clock pulse generation circuit, a divider, a random number generation circuit and a sampling circuit, it is constituted so as to execute sampling of random numbers based on an operation program of the sub-CPU 74. The program ROM 75 stores a control program to be executed by the sub-CPU 74. The work RAM 76 is constituted as a temporary memory to be used by the sub CPU 74 in executing the control program.

The image control circuit 81 has an image control CPU 82, an image control work RAM 83, an image control program ROM 84, an image ROM 86, a video RAM 87 and an image control IC 88. The image control CPU 82 determines the image to be displayed on the upper display portion 3A and the main display portion 3B based on the parameters set in the sub-micro computer 73 and the image control programs stored in the image control program ROM 84. For example, the upper display portion 3A displays a payout table and a help screen.

The main display portion 3B carries out scrolled display and stopped display on the respective symbol display portions 111A to 111C, 112A to 112C, 113A to 113C, 114A to 114C, and 115A to 115C.

The image control program ROM 84 stores an image control program and various types of selection tables relating to display on the upper display portion 3A and the main display portion 3B. The image control work RAM 83 functions as a temporary memory to be used in execution of the image control program in the image control CPU 82. The image control IC 88 forms an image in accordance with the contents determined by the image control CPU 82 and then outputs the image thus formed to the upper display portion 3A and the main display portion 3B.

The image ROM 86 stores dot data for forming an image. The video RAM 87 functions as a temporary memory to be used by the image control IC 88 in forming an image.

Here, the internal construction of the slot machine 1 as mentioned above is merely one example and one or more aspects of the invention is not so limited. For example, memory card and/or PLD (Programmable Logic Device) may be detachably from the slot machine 1 and necessary information may be read from the memory card and/or the PLD.

The slot machine 1 of the embodiment employs coins, bills or electronic value information (credit) corresponding to these, as gaming values. The gaming values applicable to one or more aspects of the invention are not limited to those described above, and can include, for instance, medals, tokens, electronic money and tickets. In the embodiment, it is mainly described that credit(s) are provided, however, one or more aspects of the invention is not so limited to the embodiment.

Figure 7:
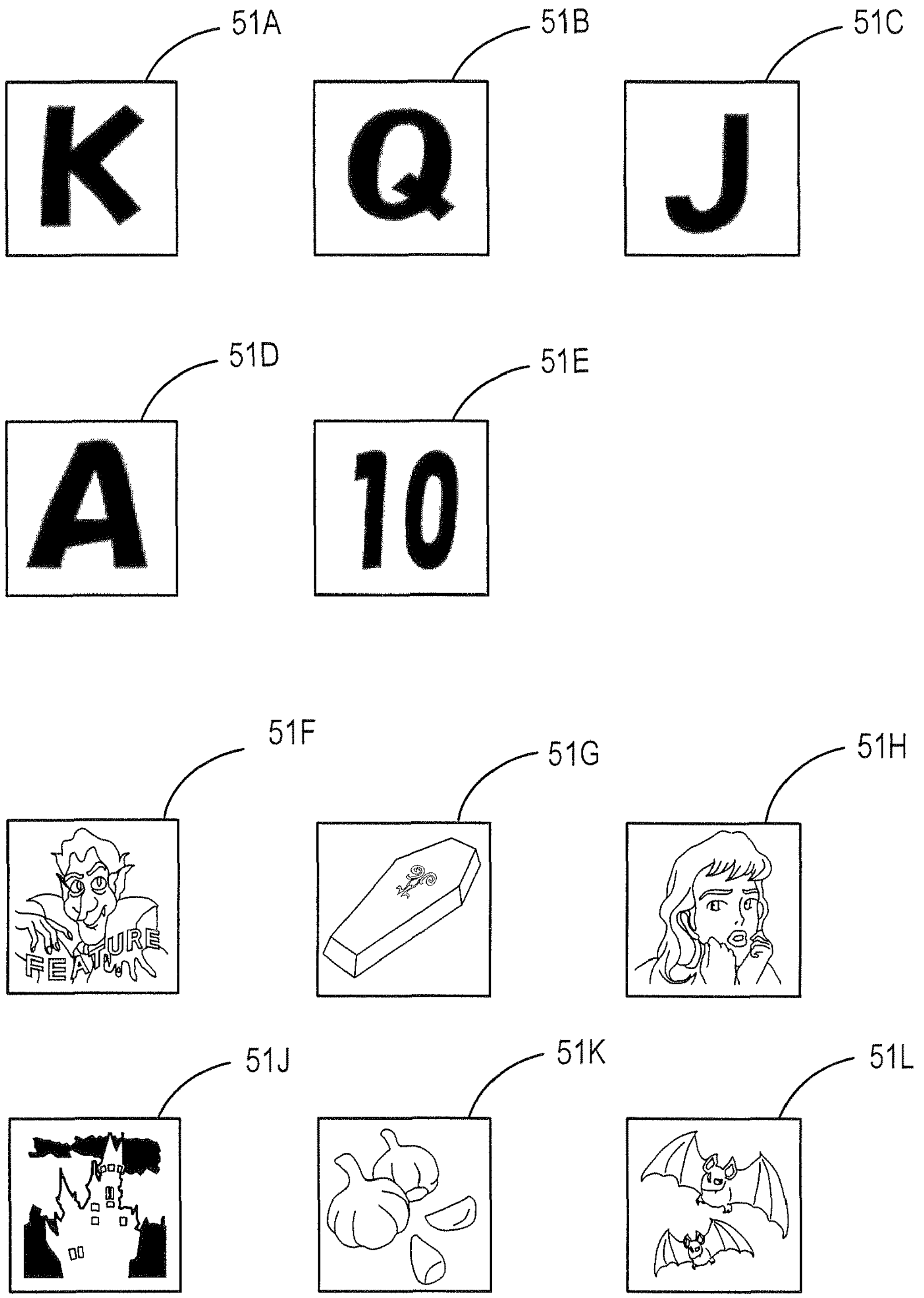
FIG. 7 is a view showing symbols displayed on each reel of the slot machine in accordance with one or more aspects of the invention.

Next, the symbols displayed on reel variably displaying on the symbol display portion will be described with reference to FIG. 7. FIG. 7 shows on example of kinds of symbols displayed on the reel variably displaying on the symbol display portion.

The symbols used in the embodiment include KING symbol 51A, QUEEN symbol 51B, JACK symbol 51C, ACE symbol 51D, TEN symbol 51E, DRACULA symbol 51F, COFFIN symbol 51G, BEAUTY symbol 51H, CASTLE symbol 51J, GARLIC symbol 51K, and BAT symbol 51L.

Here, the number of the symbols which are displayed on one reel is variable and the type of the displayed symbols is variable.

FIG. 8 is a view showing one example of reel to be variably displayed on each of the symbol display portions. As shown in FIG. 8, symbols shown in FIG. 6 are displayed on the reel in a predetermined order.

Here, a sequence of the symbols shown in FIG. 8 is merely one example, and the sequence of the symbols can be set arbitrarily.

Also, reels to be used can be different on each symbol display portion. Also, plural reels are equipped and the reel can be selected based on payout ratio which is set.

Next, games executed in the slot machine 1 of the embodiment will be described. The games executed in the embodiment are constructed from two of games. The two of games is the base game and the bonus game.

First, the base game will be described. In the base game, a winning combination is determined based on the number of same symbols displayed on the symbols display portions 111A to 115A, 111B to 115B, and 111C to 115C on the main display portion 3B, and an award corresponding to the winning combination is provided.

Figure 9:
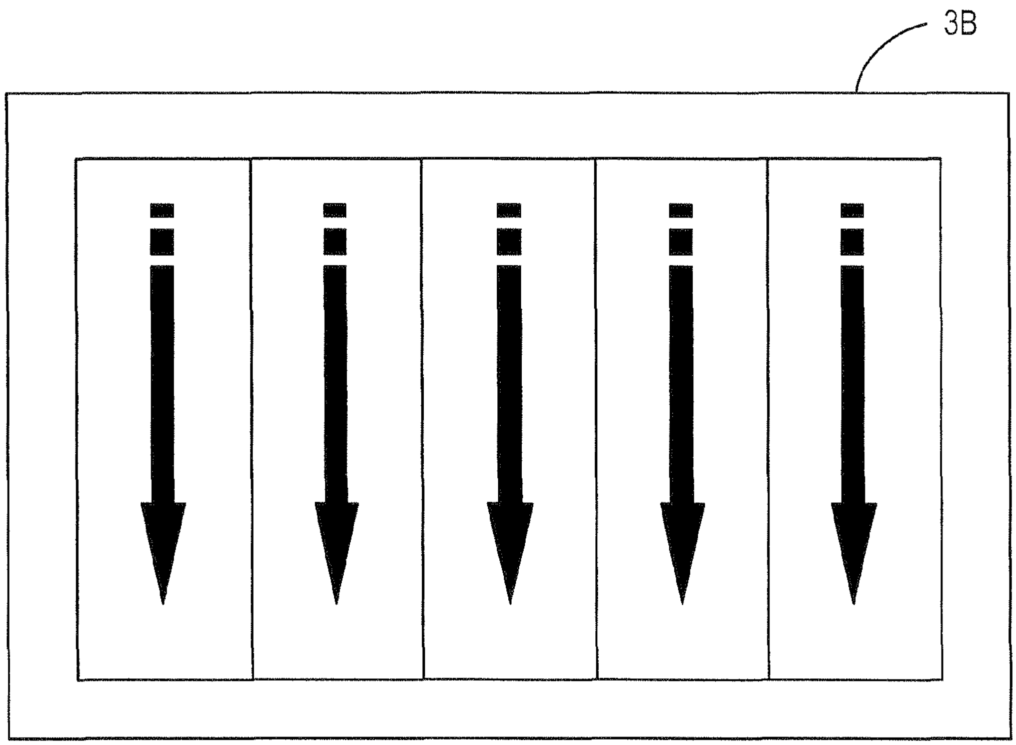
FIG. 9 is a view showing a condition where reels are variably displayed on variably display portions of the slot machine in accordance with one or more aspects of the invention.
Figure 10:
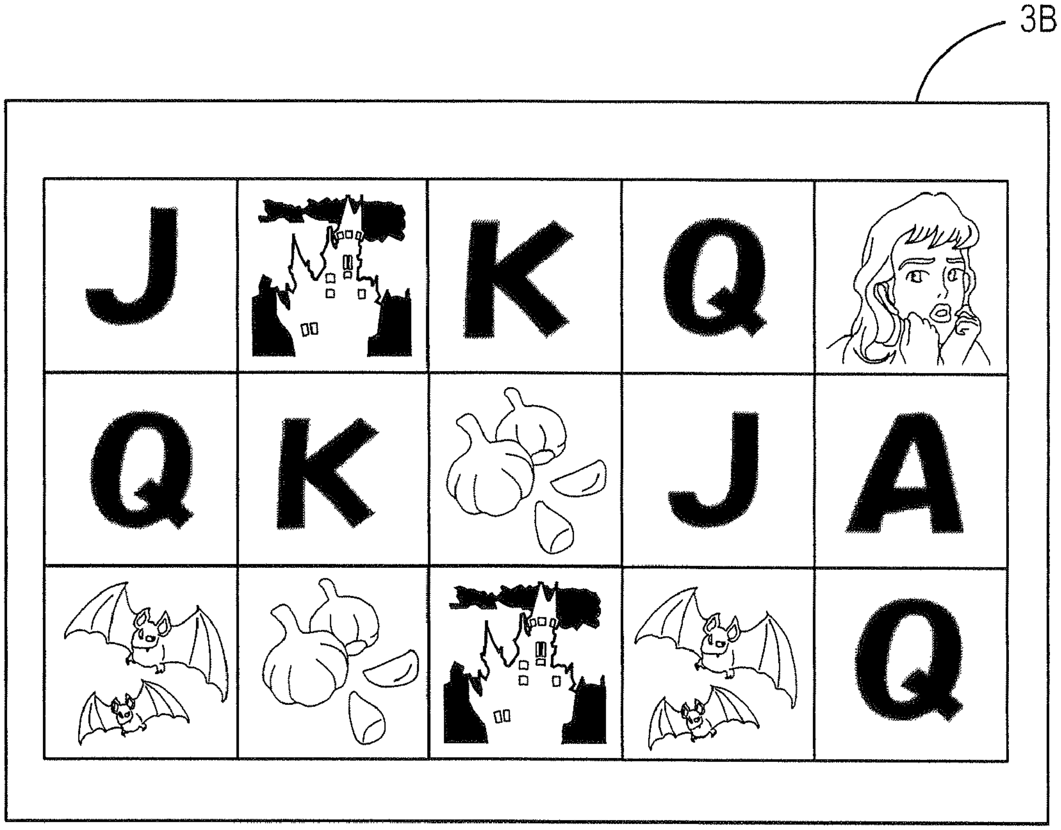
FIG. 10 is a view showing a condition where symbols are stopped displayed on variably display portions of the slot machine in accordance with one or more aspects of the invention.

When the bet count is determined based on the operation of the bet button, and then the start button is input, the reels start to spin on the each of the reel display portions. Accordingly, the symbol rows displayed on the reel are scrolled from top to bottom, as shown in FIG. 9. After a predetermined time, the reels are stopped displayed on the reel display portions 101 through 105. Accordingly, a part of the symbol rows of the reel (total of fifteen symbols which three symbols on each reel display portion 101 to 105) are displayed in the symbol display portion on the variably display portion 3B respectively, as shown in FIG. 10. Here, scroll direction can be from the bottom to top not limited to from top to bottom. Also, the scroll direction can be different on each reel display portion. Also, the scroll direction can be different on each game.

In the embodiment, stopping sequence of the symbol display portions can be set arbitrarily. That is, reels can be stopped on all of the symbol display portions (symbol display portions 101 to 105) at once.

After, reels are stopped, the winning combination is determined based on the number of the same displayed symbols and an award corresponding to the determined winning combination will be provided. If the winning combination is realized, amount of outcome, which the payout number corresponding to the winning combination is multiplied by the bet number, is provided to the player.

Next, the fee game will be described. The free game is executed if a predetermined number (for example, three) or more of scatter symbols (in the embodiment, the DRACULA symbols 51F) are displayed on the symbol display portions 111A to 115A, 111B to 115B, 111C to 115C. With respect to the procedure of the free game, the free game is the same as the base game, except that in the free game, gaming values (credits) corresponding to the bet amount are not consumed at the start of the game, and the game is continuously carried out automatically without requiring the player to operate the operation button.

Next, the winning combination and payout number thereof used in the game in the slot machine 1 of the embodiment will be described with reference to FIG. 11. FIG. 11 shows payout table which indicates the winning combination and payout number thereof used in the game.

Here, FIG. 11 indicates the payout number in the case where the bet count is "1". If the bet count is "1", the payout number shown in FIG. 11 will be provided. If the bet count is more than "2", the payout number shown in FIG. 11 will be multiplied by the bet count, and multiplied number will be provided.

For example, if five of KING symbols 51A are displayed on the symbol display portions 111A to 115A, 111B to 115B, 111C to 115C, amount of outcome which 50 credit is multiplied by the bet number will be provided to the player.

For example, if four of ACE symbols 51D are displayed on the symbol display portions 111A to 115A, 111B to 115B, 111C to 115C, amount of outcome which 40 credit is multiplied by the bet number will be provided to the player.

In a similar way, the payout numbers are defined on each of the winning combinations shown in FIG. 11. Here, the displayed symbols on the symbol display portions 111A to 115A, 111B to 115B, 111C to 115C are not associated with any of the winning combinations shown in FIG. 11, the game is lost. If the game is lost, none of the payout number will be paid.

Here, the payout table shown in FIG. 11 is merely one example, and the types of the winning combinations and the payout number is variable. Also, in one or more aspects of the invention, plural payout tables are provided and the payout table can be selected based on the payout ratio which is set. Also, payout table used in the free game can be different from the payout table used in the base game.

Figure 12:
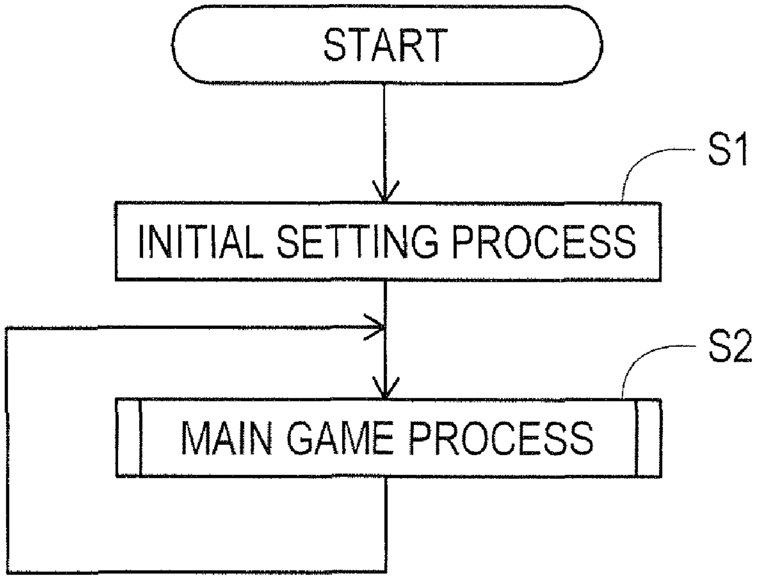
FIG. 12 is a flowchart of a main control process in the slot machine in accordance with one or more aspects of the invention.

Next, a main control program executed in the slot machine 1 of the embodiment will be described in detail with reference to drawings. FIG. 12 is a flowchart of the main control program.

First, when the power switch is turned on (upon power on), the main control board 71 and the sub-control board 72 are activated, and the controller 41 executes an initial setting process at step (hereinafter referred to as S) 1. In the initial setting process, the main CPU 42 executes the BIOS stored in the ROM 44 and expands the compressed data incorporated in the BIOS in the RAM 43. By executing the BIOS that was expanded in the RAM 43, the main CPU 42 carries out a diagnosis and initialization of the different types of peripheral devices. Further, the main CPU 42 writes the game programs and the like from the ROM 44 into the RAM 43 to acquire payout rate setting data and country identification information. While executing the initial setting process, the main CPU 42 also carries out an authentication process with respect to each program.

Then, at step S2, the main CPU 42 sequentially reads the game programs and the like from the RAM 43 and executes these programs to carry out a main game process. The slot machine 1 according to the embodiment carries out the game by executing this main game process. The main game process is repeatedly executed while power is supplied to the slot machine 1.

Figure 13:
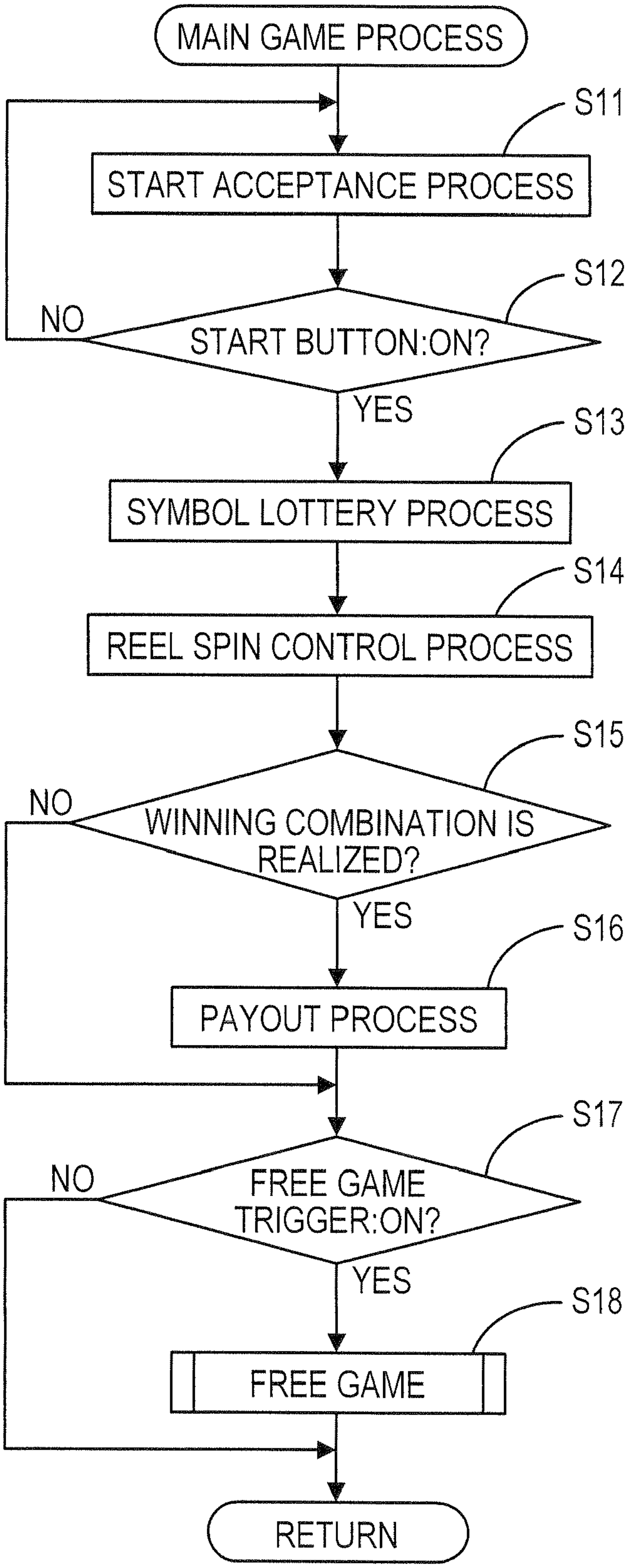
FIG. 13 is a flowchart of a main game process in the slot machine in accordance with one or more aspects of the invention.

Next, a sub-process of the main game process at the above-described step S2 will be described based on FIG. 13. FIG. 13 is a flowchart of the main game process program to be executed in the slot machine 1 according to the embodiment. The programs of the flowcharts as will be described later are stored in the ROM 44 and RAM 43 provided in the slot machine 1 and are executed in the main CPU 42.

At S11, the start acceptance process is executed. In the start acceptance process, the player inserts coins and places a bet using the BET button from amongst the operation buttons 26.

And, at S12, the main CPU 42 determines whether or not the start button from amongst the operation buttons 26 has been depressed. That is, it is determined whether or not the start button is ON. This determination is carried out based on the signal inputted to the main CPU 42 in response to depression of the start button. Here, if the start button has not been depressed (S12: NO), the flow returns to the start acceptance process (S11). As a result, the player can carry out an operation to correct, etc. the bet amount. Alternatively, if the start button has been depressed (S12: YES), the main CPU 42 subtracts the bet amount set based on the above-described bet operation from the credit amount that the player currently possesses and at the same time stores the result as bet information in the RAM 43. After that, the procedure will be shifted to S13.

At S13, the symbol lottery process is executed. Concretely, at first, random number value is sampled from a number value range within a predetermined random number value range by executing the lottery program stored in the RAM 43. After that, symbols to be stopped on each symbol display portion based on the sampled random number values and the table.

The process in S13 will be described. FIG. 14 shows one example of a table in which symbols displayed on reels shown in FIG. 8 correspond to code numbers. FIG. 15 is one example of a table in which random number values correspond to the code numbers. The code numbers are determined with the use of the table shown in FIG. 15 based on the sampled random number values among predetermined random number range (for example, from 0 to 65535). The symbols to be stopped are determined with the use of the determined code numbers and the table shown in FIG. 14.

Here, as shown in FIG. 15, since the number of random number values corresponding to each code number is different, each of probabilities of appearance of each symbol shown in FIG. 15 is controlled. For example, in FIG. 16, code number “4” corresponds to random number values “512” to “760”, code number “5” corresponds to “761” to “767”. Therefore, since the code number “4” may more appear than the code number “5”, the JACK symbol 51C corresponding to the code number “4” may more appear than the CASTLE symbol 51J corresponding to the code number “5” in the reel shown in FIG. 8.

Also, with respect to the symbol display portion 113A, in a case where reel shown in FIG. 8 is used and “1136” is sampled, it is determined that code number is “08” based on the table shown in FIG. 16. And then, it is determined that the TEN symbol 51E corresponding to the code number “08” will be displayed on the symbol display portion 113A with the use of the table shown in FIG. 15.

Also, as shown in FIG. 16, the random number values to be sampled may correspond to symbols.

Returning to FIG. 13 for explanations. At S14, a reel spin control process is executed. Specifically, the main CPU 42 variably displays each of the reels on the reel display portions 101 to 105. After that, the main CPU 42 determines effects pattern (image display pattern of the main display portion 3B, sound output pattern of the loudspeaker 34, or the like) in a unit game and send predetermined signal to sub-control board 72 so as to start effects based on the determined effects pattern. Here, the unit game means a sequence of process where each of the reels starts to variably display and then the entire reels are stopped displayed.

Then, after the lapse of a predetermined period of time, reels are stopped to spin on the symbol display portion 111A to 115A, 111B to 115B, and 111C to 115C. Accordingly, symbols are stopped on each of the symbol display portions 111A to 111C, 112A to 112C, 113A to 113C, 114A to 114C, and 115A to 115C.

Here, the symbol determined at S13 is stopped on the symbol display portion 111B. For example, if the COFFIN symbol 51G (code number: 9) is stopped, the TEN symbol 51E (code number: 8) is displayed on the symbol display portion 111A and the KING symbol 51A (code number: 10) is displayed on the symbol display portion 111C (see FIG. 14).

After that, at S15, it is determined whether or not the symbols arranged on the main display portion 3B are the winning combination. This determination is performed based on the code numbers of each reel display portion 101 to 105 stored in the RAM 43.

If it is determined that the winning combination is realized (S15:YES), the procedure will be shifted to S16. On the other hand, if it is determined that none of the winning combinations is not realized (S15:NO), the procedure will be shifted to S17.

At S16, the payout number corresponding to the winning combination, which is determined at S15, is provided to the player. That is, the payout process is executed. After that, the procedure will be shifted to S17.

Figure 17:
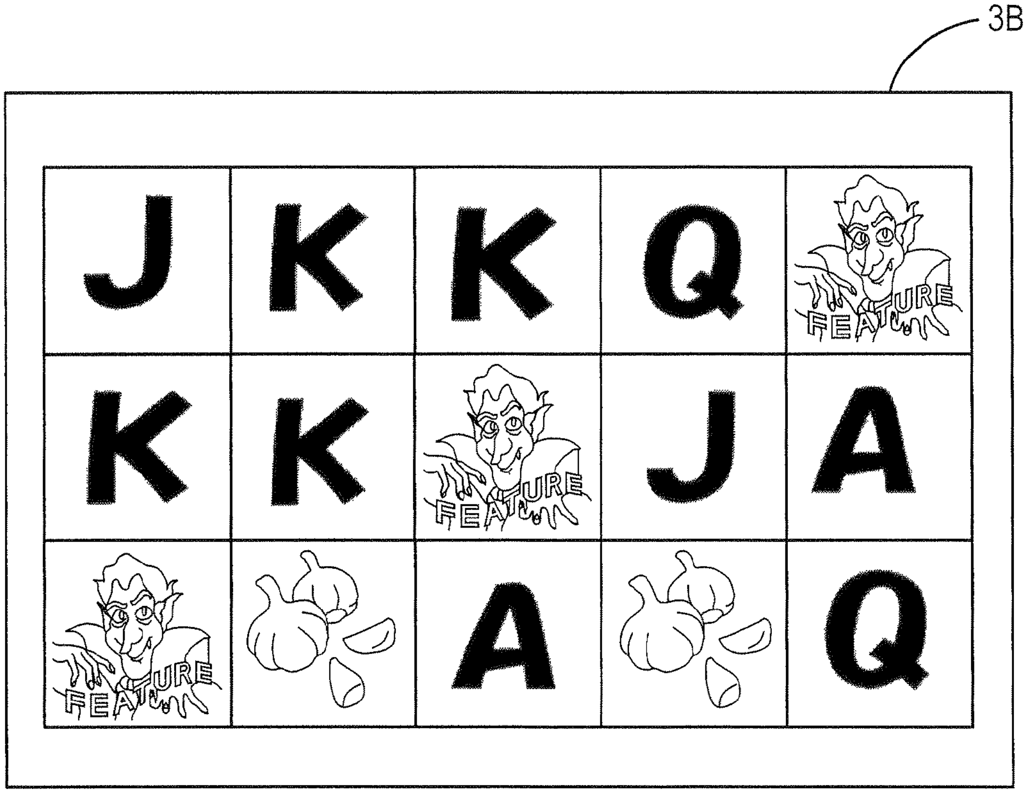
FIG. 17 is a view showing an example of display content of symbol display portions in accordance with one or more aspects of the invention.

At S17, it is determined whether or not the free game trigger is ON. In the embodiment, if three or more of the DRACULA symbols 51F are stopped, it will be determined "YES" at S17. FIG. 17 shows a condition where three of the DRACULA symbols 51F are displayed.

At S17, if it is determined "YES" (S17:YES), the procedure will be shifted to S18. At S18, a free game process is executed. Details of the free game process will be described later.

On the other hand, at S17, if it is determined that three or more of the DRACULA symbols 51F are not stopped (S17: NO), the main game process is terminated.

Figure 18:
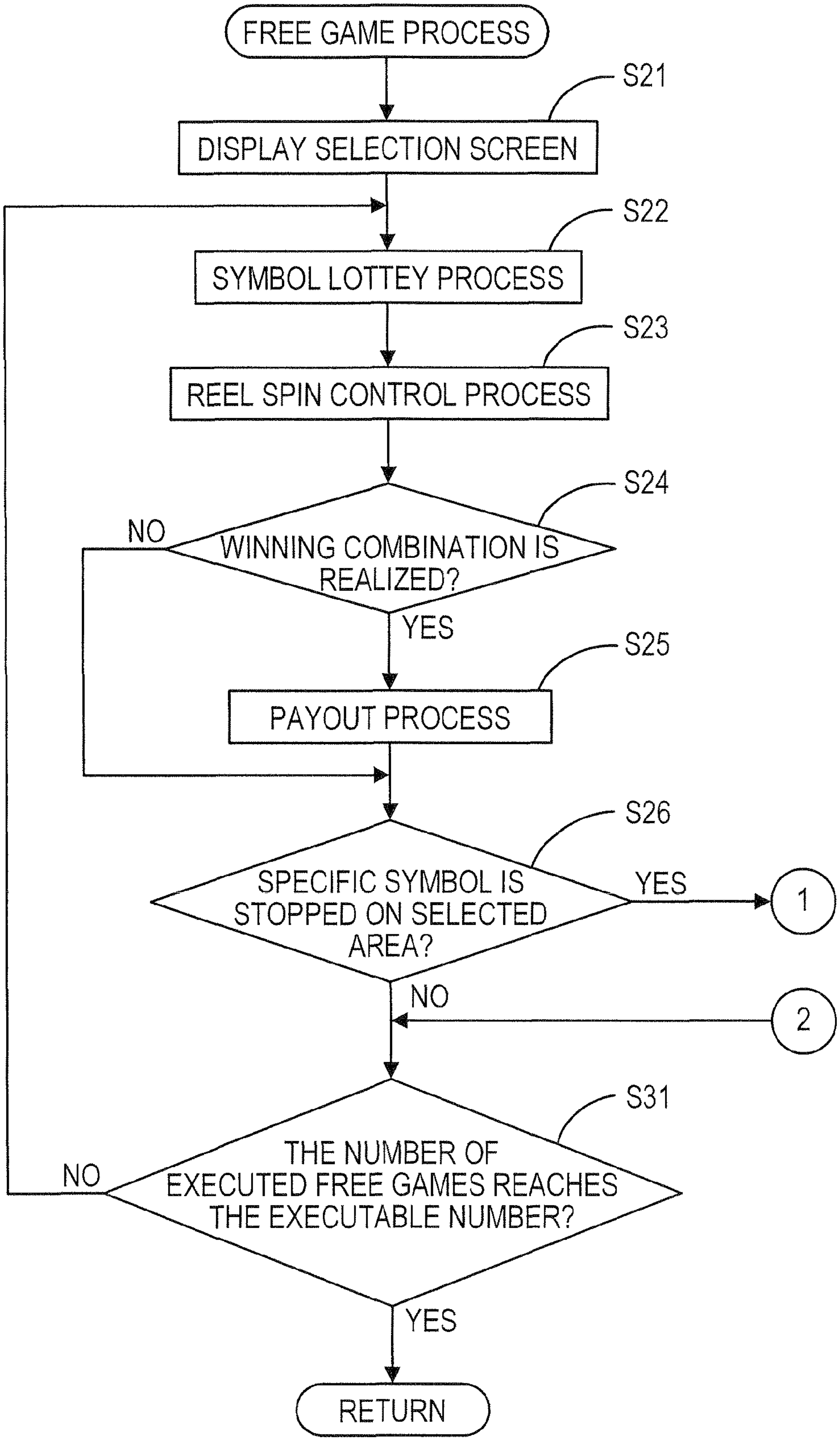
FIG. 18 is a flowchart of a free game process in the slot machine in accordance with one or more aspects of the invention.
Figure 19:
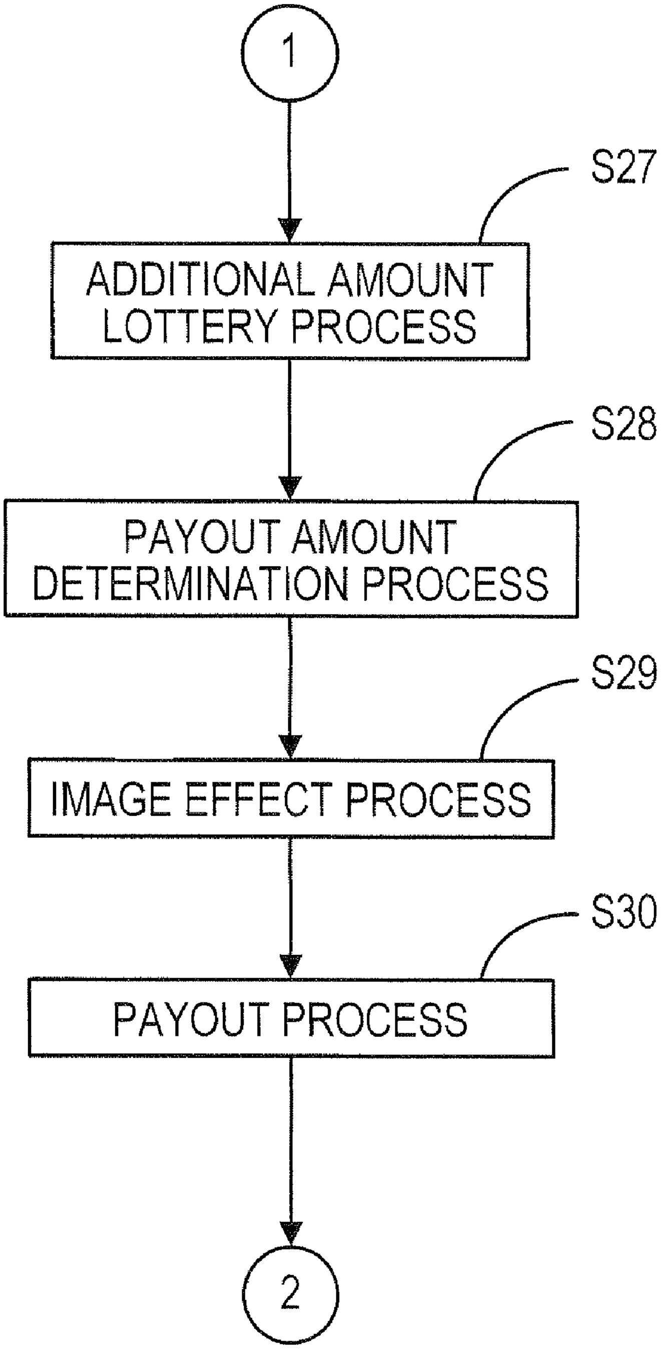
FIG. 19 is a flowchart of the free game process in the slot machine in accordance with one or more aspects of the invention.

Next, the free game process will be described. FIG. 18 and FIG. 19 are flowcharts of the free game process.

At S21, a selection screen is displayed on the main display portion 3B.

Figure 20:
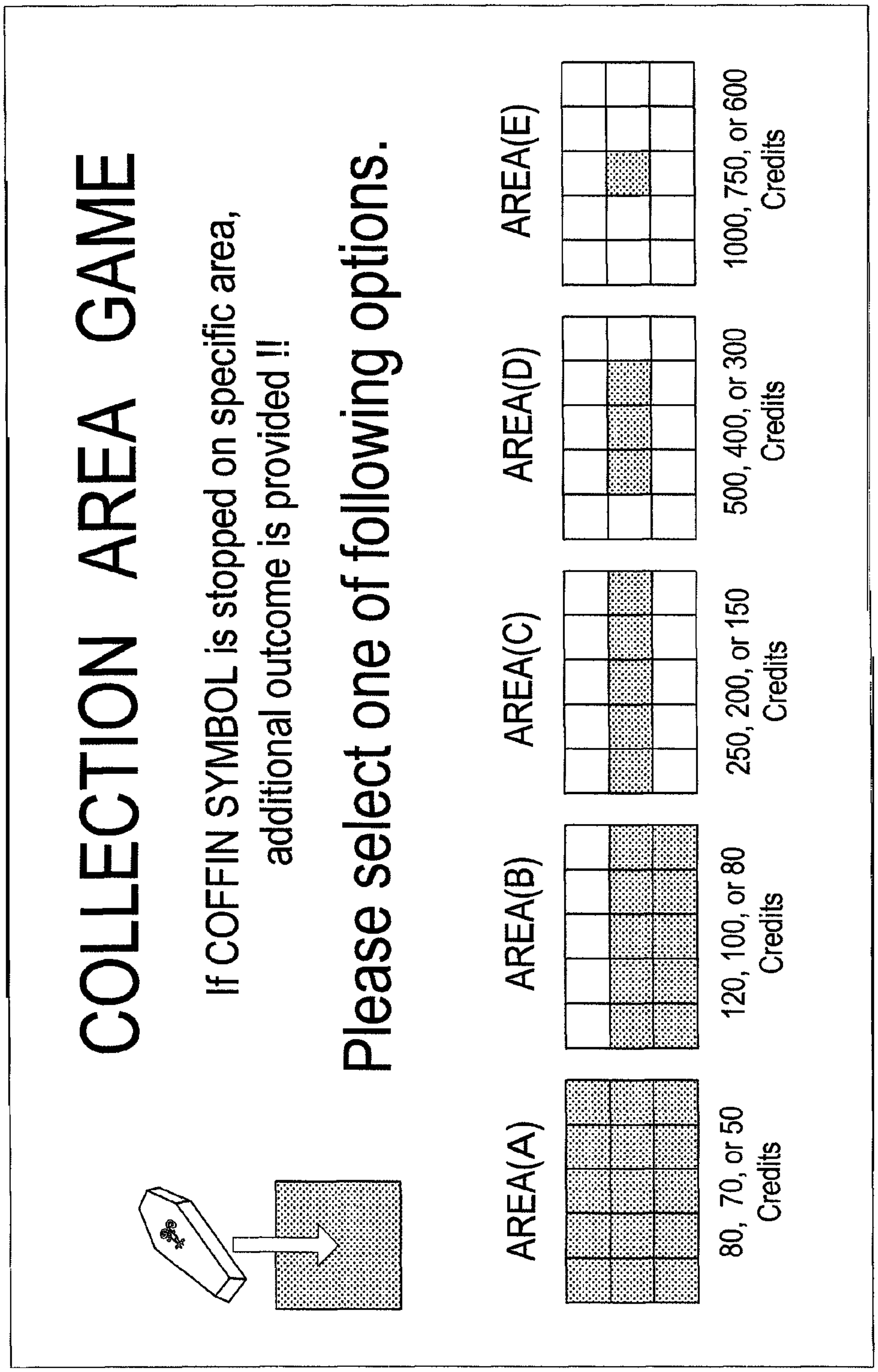
FIG. 20 is a view showing an example of a selection screen in the slot machine in accordance with one or more aspects of the invention.

FIG. 20 shows one example of the selection screen.

The user selects specific area (special area) of free games. The user selects any of area (A), area (B), area (C), area (D), or area (E). At this time, the user uses the touch panel 4.

In a case where the area (A) is selected, if the COFFIN symbol 51G is displayed on symbol display portions 111A to 115A, 111B to 115B, and 111C to 115C, credit amount in which one additional amount (any of 80 credits, 70 credits, or 50 credits) is multiplied by the number of the COFFIN symbols 51G displayed on the symbol display portions and bet amount. The additional amount is determined by lottery.

For example, in a case where additional amount is "80" credits, if the three of COFFIN symbols 51G are displayed and bet amount is "5" credits, the credit amount to be provided is "1200" credits (that is, 80×3×5).

In a case where the area (B) is selected, if the COFFIN symbol 51G is displayed on symbol display portions 111A to 115A, 111B to 115B, and 111C to 115C, credit amount in which one additional amount (any of 120 credits, 100 credits, or 80 credits) is multiplied by the number of the COFFIN symbols 51G displayed on the symbol display portions and bet amount. The additional amount is determined by lottery.

For example, in a case where additional amount is "120" credits, if the three of COFFIN symbols 51G are displayed and bet amount is "5" credits, the credit amount to be provided is "1800" credits (that is, 120×3×5).

In a case where the area (C) is selected, if the COFFIN symbol 51G is displayed on symbol display portions 111A to 115A, 111B to 115B, and 111C to 115C, credit amount in which one additional amount (any of 250 credits, 200 credits, or 150 credits) is multiplied by the number of the COFFIN symbols 51G displayed on the symbol display portions and bet amount. The additional amount is determined by lottery.

For example, in a case where additional amount is "250" credits, if the three of COFFIN symbols 51G are displayed and bet amount is "5" credits, the credit amount to be provided is "3750" credits (that is, 250×3×5).

In a case where the area (D) is selected, if the COFFIN symbol 51G is displayed on symbol display portions 111A to 115A, 111B to 115B, and 111C to 115C, credit amount in which one additional amount (any of 500 credits, 400 credits, or 300 credits) is multiplied by the number of the COFFIN symbols 51G displayed on the symbol display portions and bet amount. The additional amount is determined by lottery.

For example, in a case where additional amount is "500" credits, if the three of COFFIN symbols 51G are displayed and bet amount is "5" credits, the credit amount to be provided is "7500" credits (that is, 500×3×5).

In a case where the area (E) is selected, if the COFFIN symbol 51G is displayed on symbol display portions 111A to 115A, 111B to 115B, and 111C to 115C, credit amount in which one additional amount (any of 1000 credits, 750 credits, or 600 credits) is multiplied by the number of the COFFIN symbols 51G displayed on the symbol display portions and bet amount. The additional amount is determined by lottery.

For example, in a case where additional amount is "1000" credits, if the three of COFFIN symbols 51G are displayed and bet amount is "5" credits, the credit amount to be provided is "15000" credits (that is, 1000×3×5).

As shown in FIG. 20, as the number of selected areas is larger, the additional amount is smaller. That is, as the number of selected areas is smaller, the additional amount is larger. Herewith, the free game can be executed according to player's taste.

Also, above the correspondence relationship between area and additional amount is merely one example. Also, above the number of selectable areas is merely one example. Also, above the correspondence relationship between area and additional amount is merely one example.

Explanation is retuned to S18.

Since processes of S22 through S25 are same as the processes of S13 through S16 of the main game process (FIG. 13), the explanation thereof will be omitted.

At S26, it is determined whether or not the COFFIN symbol 51G is stopped. That is, it is determined whether or not specific symbol is stopped on the selected area.

If it is determined that the COFFIN symbols 51G is stopped on the selected area (S26:YES), the procedure will be shifted to S27 (FIG. 19). If it is determined that the COFFIN symbol 51G is not stopped on the selected area (S26:NO), the procedure will be shifted to S31.

At S27, additional amount lottery process is executed.

If the area (A) is selected at S21, any of 80, 70, or 50 is selected by lottery.

If the area (B) is selected at S21, any of 120, 100, or 80 is selected by lottery.

If the area (C) is selected at S21, any of 250, 200, or 150 is selected by lottery.

If the area (D) is selected at S21, any of 500, 400, or 300 is selected by lottery.

If the area (E) is selected at S21, any of 1000, 750, or 600 is selected by lottery.

Here, the process of S27 is executed every time it is determined "YES" at S26. Herewith, additional amount can be changed every free game.

At S28, payout amount determination process is executed. In the payout amount determination process, payout amount is determined by multiplying the amount process determined at S27 by the number of the COFFIN symbols 51G displayed on the selected areas.

At S29, an image effect process is executed. Hereinafter, the image effect process is described.

Figure 21:
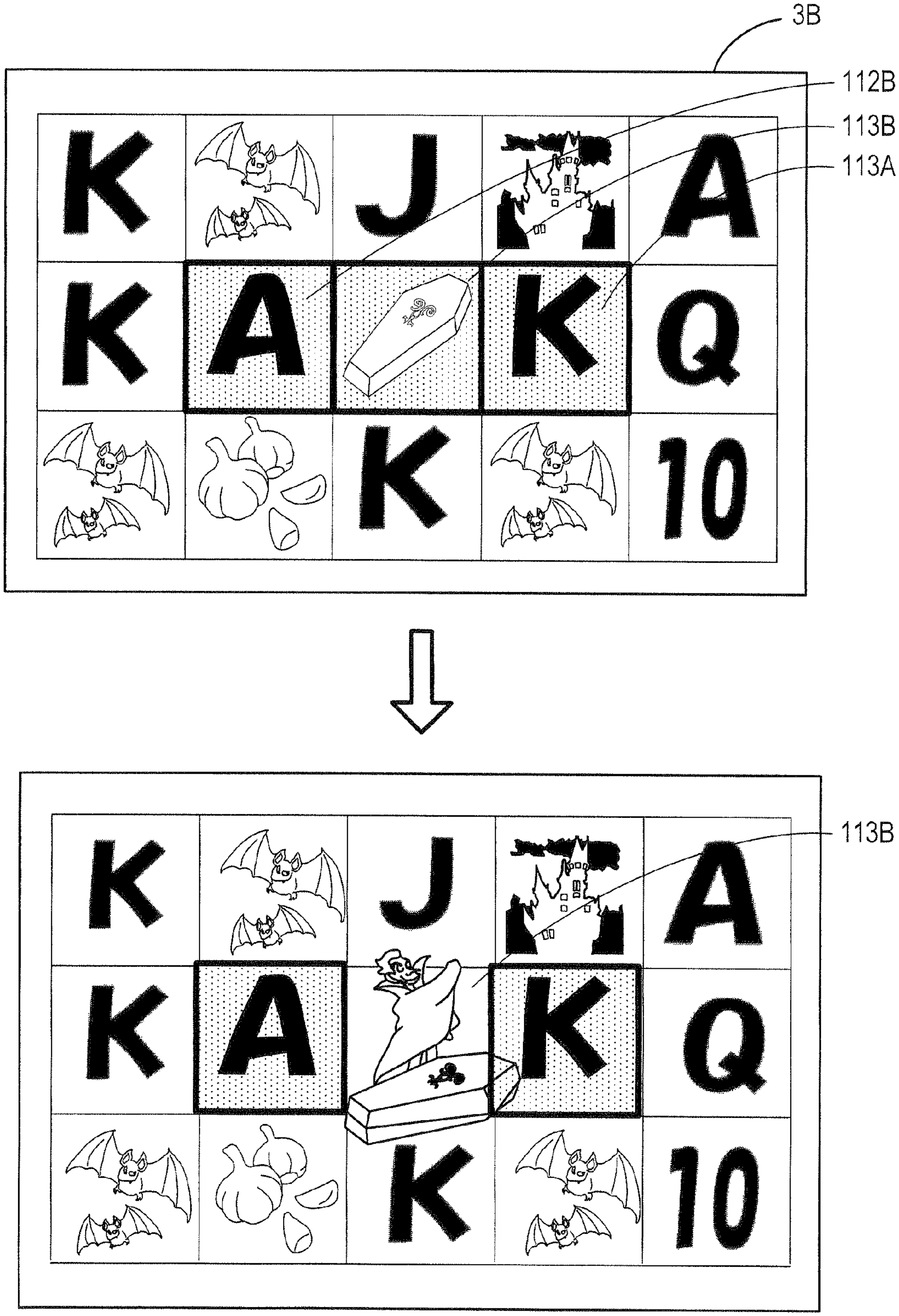
FIG. 21 is a view showing an example of display content of symbol display portions in accordance with one or more aspects of the invention.

FIG. 21 shows one example of display content of the symbol display portion.

Figure 22:
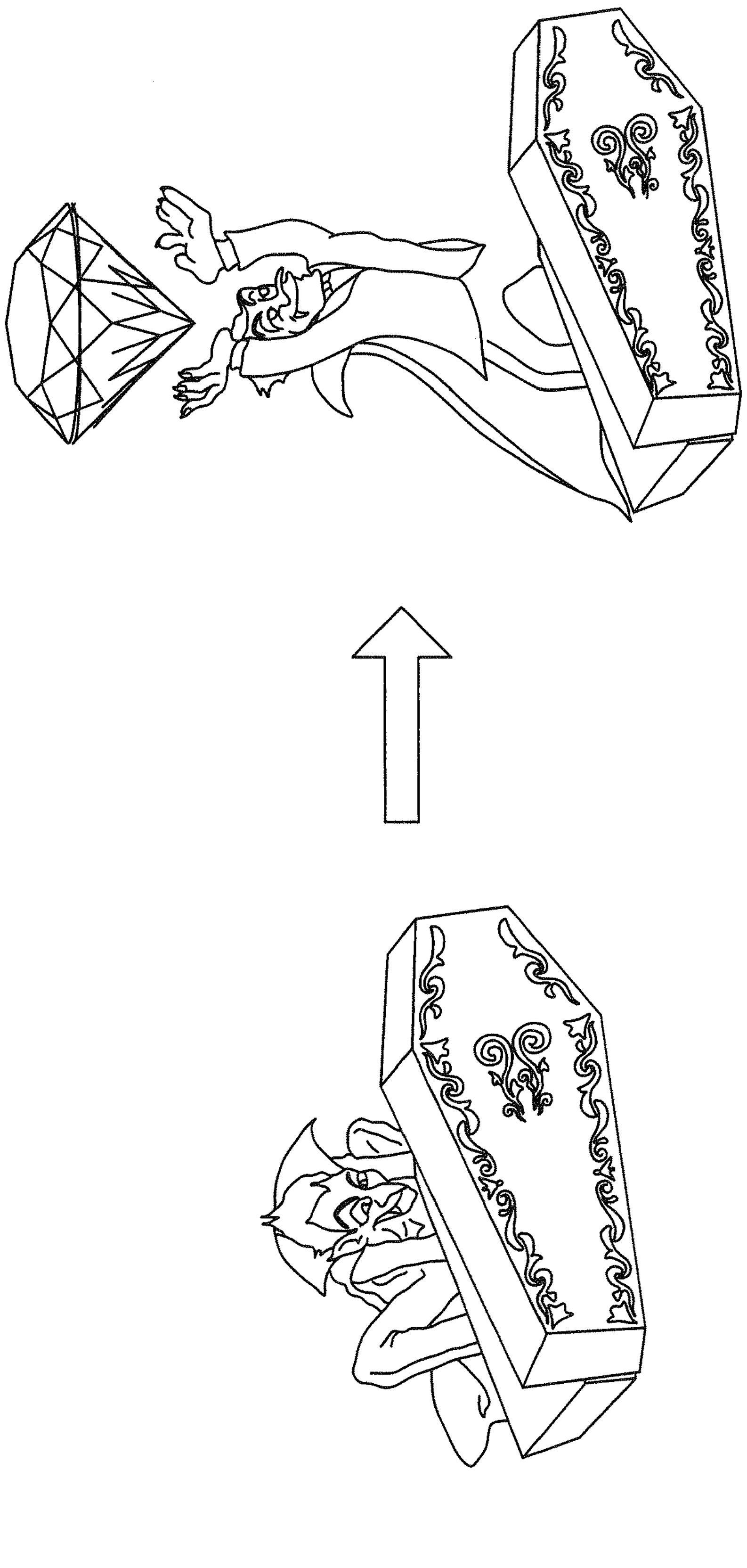
FIG. 22 is a view showing an example of an image effect in the slot machine in accordance with one or more aspects of the invention.

FIG. 22 shows on example of image effect made on the main display portion 3B in the image effect process.

Figure 23:
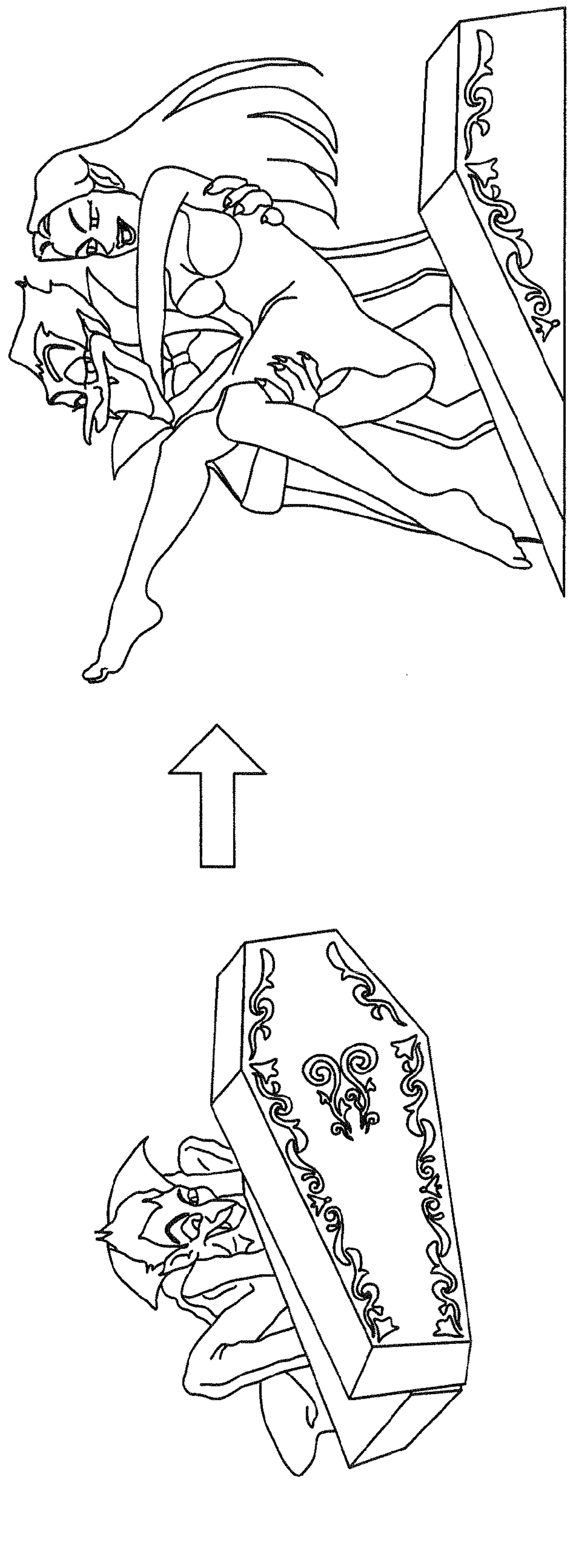
FIG. 23 is a view showing an example of an image effect in the slot machine in accordance with one or more aspects of the invention.

FIG. 23 shows on example of image effect made on the main display portion 3B in the image effect process.

An upper stage of FIG. 21 shows a condition where the area (D) is selected at S21 and the COFFIN symbol 51G is displayed on the symbol display portion 113B at the reel spin control process of S23. In the upper stage of FIG. 21, one COFFIN symbol 51G is displayed on the selected area. Also, in the upper stage of FIG. 21, background pattern of the selected area is changed.

And then, as shown in lower stage of FIG. 21, Dracula appears on the symbol display portion 113B.

And then, image effects shown in FIG. 22 or FIG. 23 are made.

If payout amount determined at the payout amount determination process of S28 is less than predetermined amount (for example, 500 credits), the image effect shown in FIG. 22 is made. Here, the image effect shown in FIG. 22 is merely one example. Also, payout amount can be displayed at same time.

If payout amount determined at the payout amount determination process of S28 is the predetermined amount (for example, 500 credits) and above, the image effect shown in FIG. 23 is made. Here, the image effect shown in FIG. 23 is merely one example. Also, payout amount can be displayed at same time.

In the example shown in FIG. 21, additional amount is determined any of 500, 400, or 300 by lottery (see FIG. 20).

If it is determined that the additional amount is "500", the image effect shown in FIG. 23 is made because payout amount is "500" (500×1) and the payout amount is the predetermined amount ("500") and above.

If it is determined that the additional amount is "400", the image effect shown in FIG. 23 is made because payout amount is "400" (400×1) and the payout amount is less than the predetermined amount ("500").

If it is determined that the additional amount is "300", the image effect shown in FIG. 23 is made because payout amount is "300" (300×1) and the payout amount is less than the predetermined amount ("500").

Figure 24:
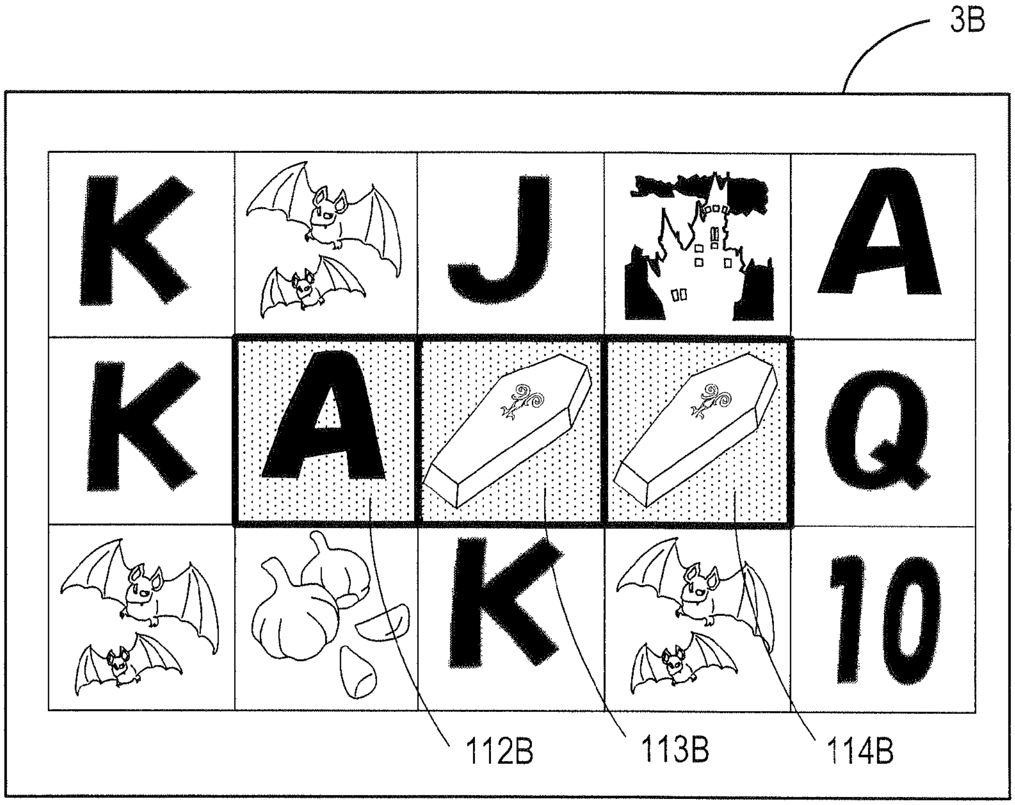
FIG. 24 is a view showing an example of display content of symbol display portions in accordance with one or more aspects of the invention.

FIG. 24 shows one example of display content of the symbol display portion. FIG. 24 shows a condition where the area (D) is selected at S21 and the COFFIN symbols 51G is displayed on the symbol display portion 113B and the symbol display portion 114B at the reel spin control process of S23. In FIG. 24, two of COFFIN symbols 51G are displayed on the selected areas. Also, in FIG. 24, background pattern of the selected areas are changed.

In the example shown in FIG. 24, additional amount is determined any of 500, 400, or 300 by lottery (see FIG. 20).

And, the image effect shown in FIG. 23 is made because payout amount is the payout amount is the predetermined amount ("500") and above even any additional amount (that is, any of 1000, 800, or 600) is selected.

Here, if plural COFFIN symbols 51G are displayed on the selected areas, image effect in which each coffin is open by turns. Also, image effect in which all coffins are open at one time.

Figure 25:
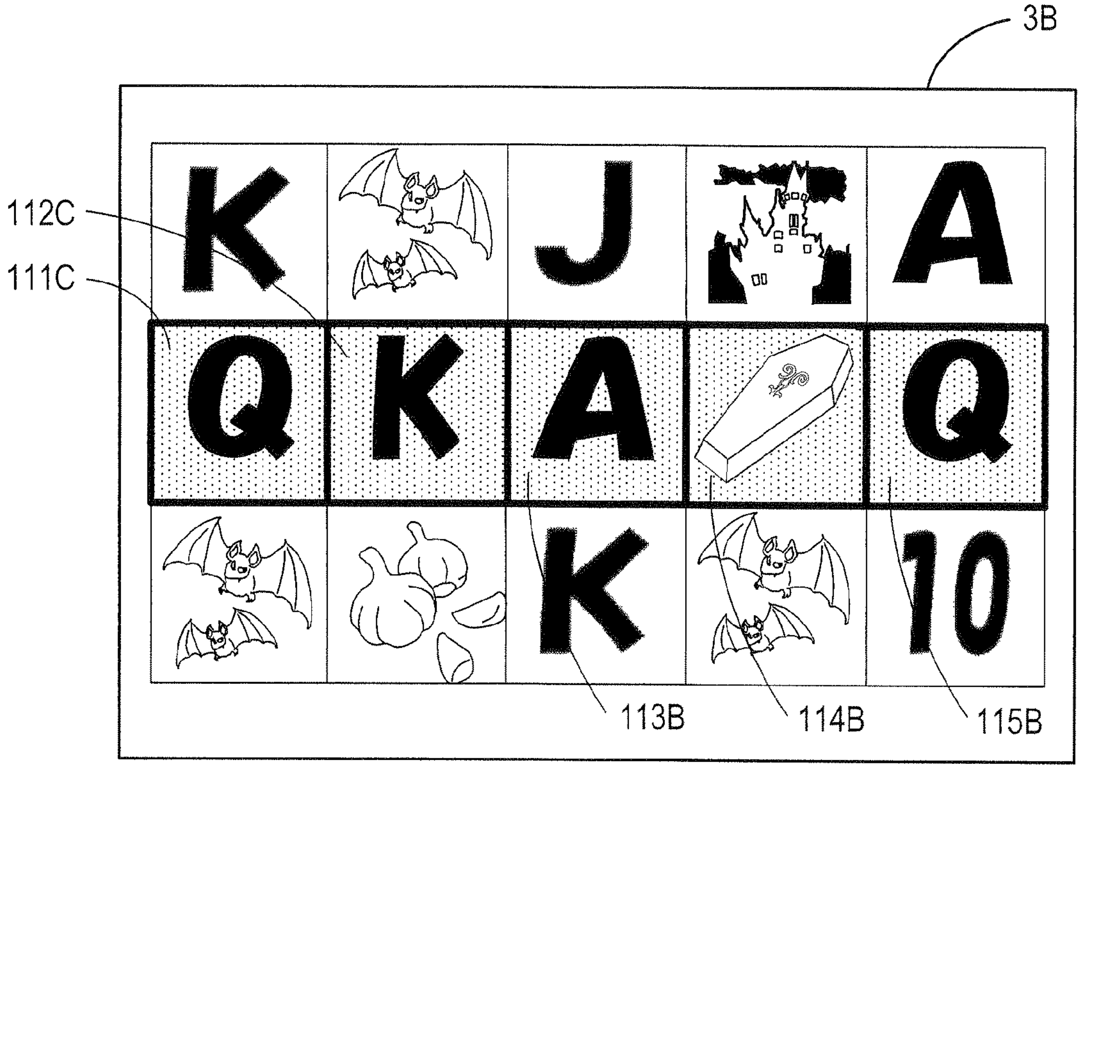
FIG. 25 is a view showing an example of display content of symbol display portions in accordance with one or more aspects of the invention.

FIG. 25 shows one example of display content of the symbol display portion. FIG. 24 shows a condition where the area (D) is selected at S21 and the COFFIN symbols 51G is displayed on the symbol display portion 114B at the reel spin control process of S23. In FIG. 25, one COFFIN symbols 51G are displayed on the selected areas. Also, in FIG. 25, background pattern of the selected area is changed.

In the example shown in FIG. 25, additional amount is determined any of 250, 200, or 150 by lottery.

And, the image effect shown in FIG. 22 is made because payout amount is less than is the predetermined amount ("500") even any additional amount (that is, any of 250, 200, or 150) is selected.

Figure 26:
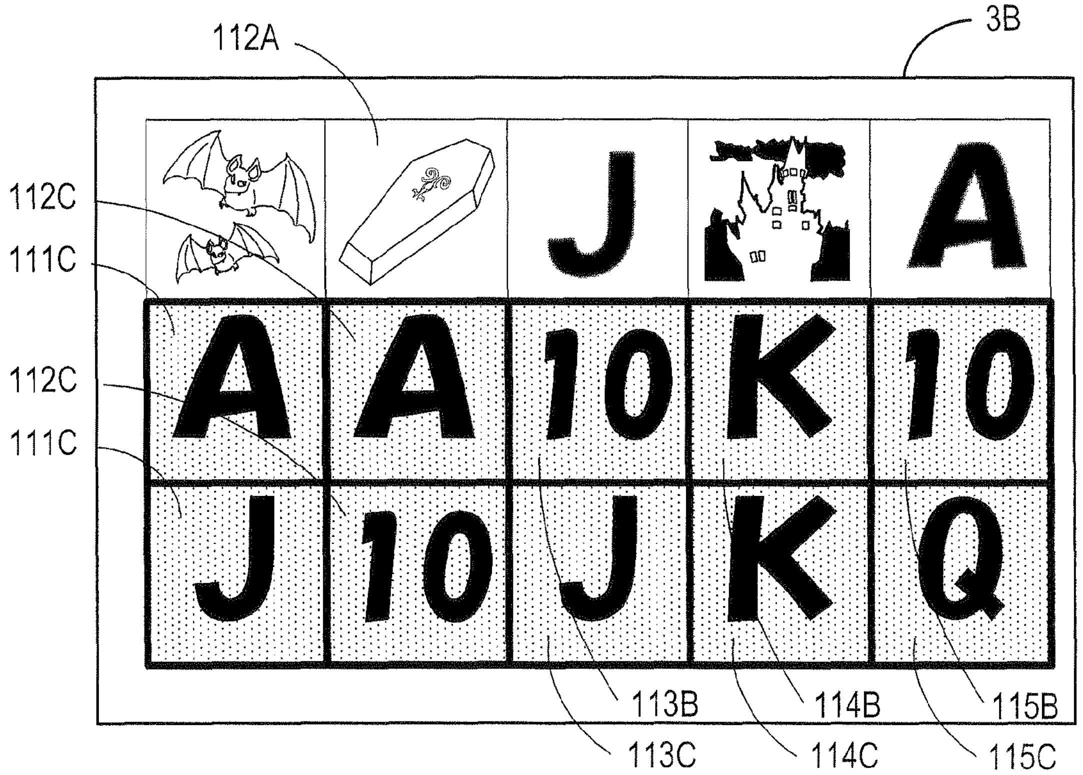
FIG. 26 is a view showing an example of display content of symbol display portions in accordance with one or more aspects of the invention.

FIG. 26 shows one example of display content of the symbol display portion. FIG. 26 shows a condition where the area (B) is selected at S21 and the COFFIN symbols 51G is displayed on the symbol display portion 112A at the reel spin control process of S23. In FIG. 25, one COFFIN symbols 51G is not displayed on the selected area. Accordingly, in the example of FIG. 25, payout is not conducted. That is, it is determined "NO" at S26.

Explanation is returned to FIG. 19. At S30, amount, in which payout amount determined at S28 is multiplied by the bet amount, is provided to the player. That is, the payout process is executed.

At S31, it is determined whether or not the number of executed free game reaches the executable number. In the embodiment, the executable number may be "8". Here, the executable number can be set arbitrarily.

If it is determined that the number of executed free games does not reach the executable number (S31:NO), the procedure will be returned to S22.

On the other hand, if it is determined that the number of executed free games reaches the executable number (S31: YES), the free game process is terminated.

As mentioned above, in the first embodiment of one or more aspects of the invention, specific area is selectable and if a specific symbol is stopped on the selected specific area in a free game, additional payout amount is provided based on the number of stopped specific symbols and additional amount. Also, the additional amount is determined from a predetermined additional amount group by lottery. Herewith, since the free game can be executed according to player's taste, the entertainment aspect is enhanced and it can attract players.

Second Embodiment

Hereinafter, a second embodiment embodying one or more aspects of the invention will be described. Since an outer appearance and an internal configuration of a slot machine of the second embodiment are the same of the slot machine of the first embodiment, explanation thereof will be omitted. Also, since a main control process and a main game process are the same as the main control process and the main game process of the slot machine of the first embodiment, explanation thereof will be omitted. Hereinafter, different points from the first embodiment will be described.

In the second embodiment, it is determined in the free whether or not the re-trigger is ON. Also, if it is determined that the re-trigger is ON, the executable number of the free games is cleared and the selection screen (see FIG. 20) is displayed again. And, the free game is executed again based on the selected specific area(s).

Figure 27:
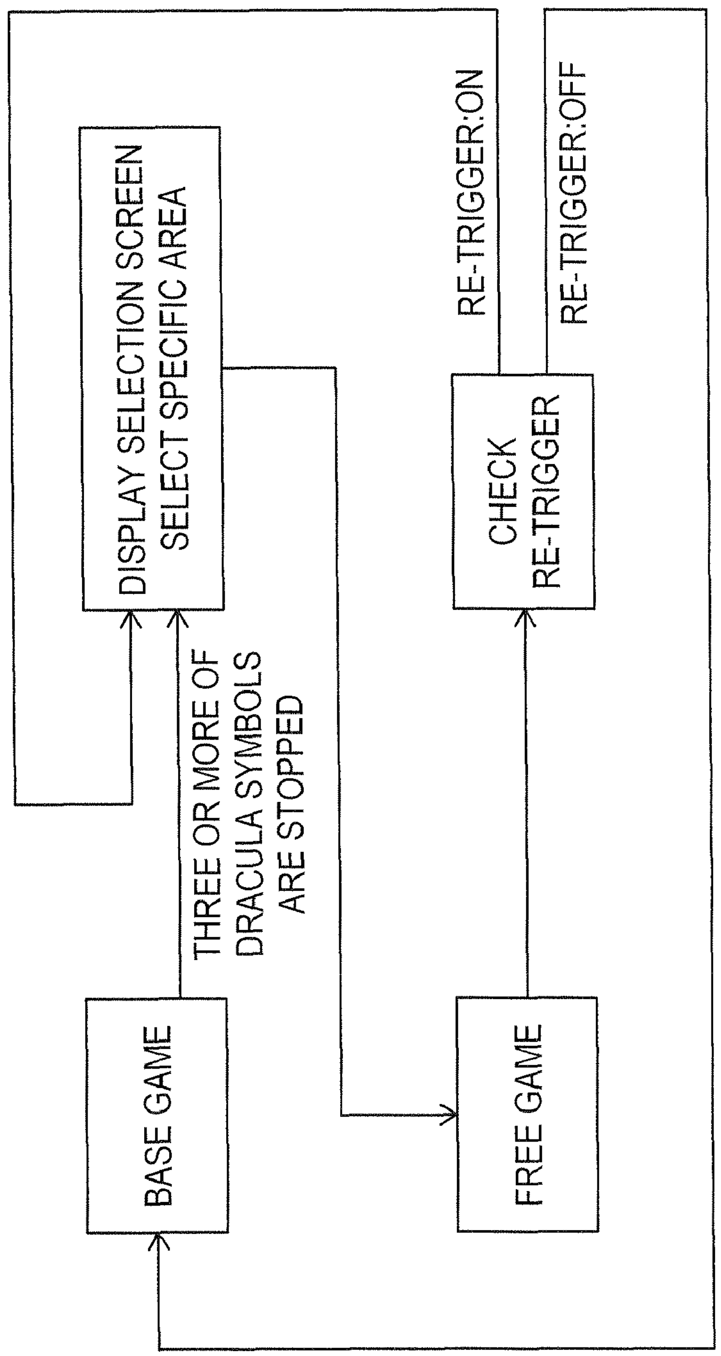
FIG. 27 is a view showing a game flow in the slot machine in accordance with one or more aspects of the invention.

FIG. 27 shows a game flow of the second embodiment. As shown in FIG. 27, re-trigger is checked in the free game. If the re-trigger is ON, the selection screen is displayed and the specific area is selected by the user. On the other hand, if the re-trigger is OFF, the base game is returned.

Figure 28:
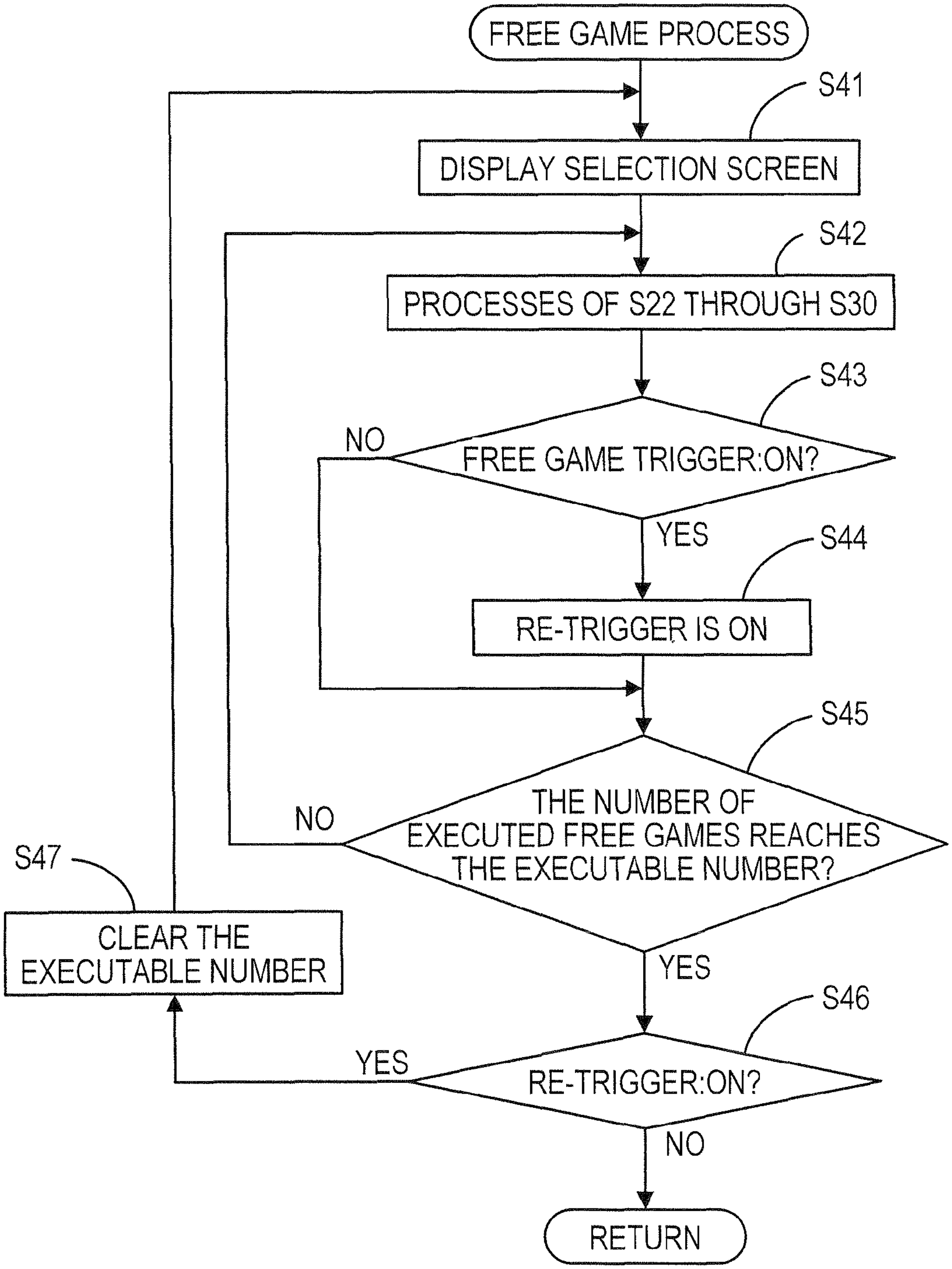
FIG. 28 is a flowchart of a free game process in the slot machine in accordance with one or more aspects of the invention.

FIG. 28 shows a flowchart of the free game process of the second embodiment.

At S41, a selection screen is displayed. Since the selection screen is the same as FIG. 20, explanation thereof will be omitted.

At S42, the processes of S22 through S30 of FIG. 18 are executed. Since these processes are the same as the processes of the first embodiment, explanation thereof will be omitted.

At S43, it is determined whether or not the free game trigger is ON. In the embodiment, if three or more of the Dracula symbol symbols 51F are stopped, it is determined "YES" at S43. FIG. 17 shows the condition where three of the DRACULA symbols 51F are displayed. Here, a process of S43 is the same as the process of S17 of the first embodiment.

If it is determined "YES" at S43 (S43:YES), the procedure will be shifted to S44. On the other hand, if it is determined at S43 that three or more of the DRACULA symbols 51F are not displayed (S43:NO), the procedure will be shifted to S45.

At S44, the re-trigger is set to ON. That is, the re-trigger is ON at S44. For example, if the re-trigger is ON, a predetermined flag (re-trigger flag) is set to a predetermined value.

At S45, it is determined whether or not the number of executed free games reaches the executable number.

If it is determined that the number of executed free games does not the executable number (S45:NO), the procedure will be returned to S42. On the other hand, if it is determined that the number of executed free games reaches the executable number (S45:YES), the procedure will be shifted to S46.

At S46, it is determined whether or not the re-trigger is ON. This determination is based on the value of the retrigger flag.

If it is determined that the re-trigger is not ON (that is, the re-trigger is OFF) (S46:NO), the free game is terminated.

On the other hand, if it is determined that the re-trigger is ON (S46:YES), the procedure will be shifted to S47. At S47, the executable number is cleared. After that, the procedure will be returned to S41.

As mentioned above, in the second embodiment of one or more aspects of the invention, specific area is selectable and if a specific symbol is stopped on the selected specific area in a free game, additional payout amount is provided based on the number of stopped specific symbols and additional amount. Also, the additional amount is determined from a predetermined additional amount group by lottery. Also, the predetermined additional amount group is determined from among plural additional amount group. Herewith, since the free game can be executed according to player's taste, the entertainment aspect is enhanced and it can attract players.

Also, if three or more of the DRACULA symbols 51F are stopped, the re-trigger is ON and free games are newly executed, hence, the number of games to be executed is increased. Herewith, the entertainment aspect is enhanced and it can attract players.

Third Embodiment

Hereinafter, a third embodiment embodying one or more aspects of the invention will be described. Since an outer appearance and an internal configuration of a slot machine of the third embodiment are the same of the slot machine of the first embodiment, explanation thereof will be omitted. Also, since a main control process and a main game process of the third embodiment are the same as the main control process and the main game process of the slot machine of the first embodiment, explanation thereof will be omitted. Hereinafter, different points from the first embodiment and the second embodiment will be described.

A game flow of the third embodiment is the same as the game flow of the second embodiment (see FIG. 27). Here, in the third embodiment, if re-trigger is ON, the number of executed free game is cleared and the selection screen is displayed again.

Figure 29:
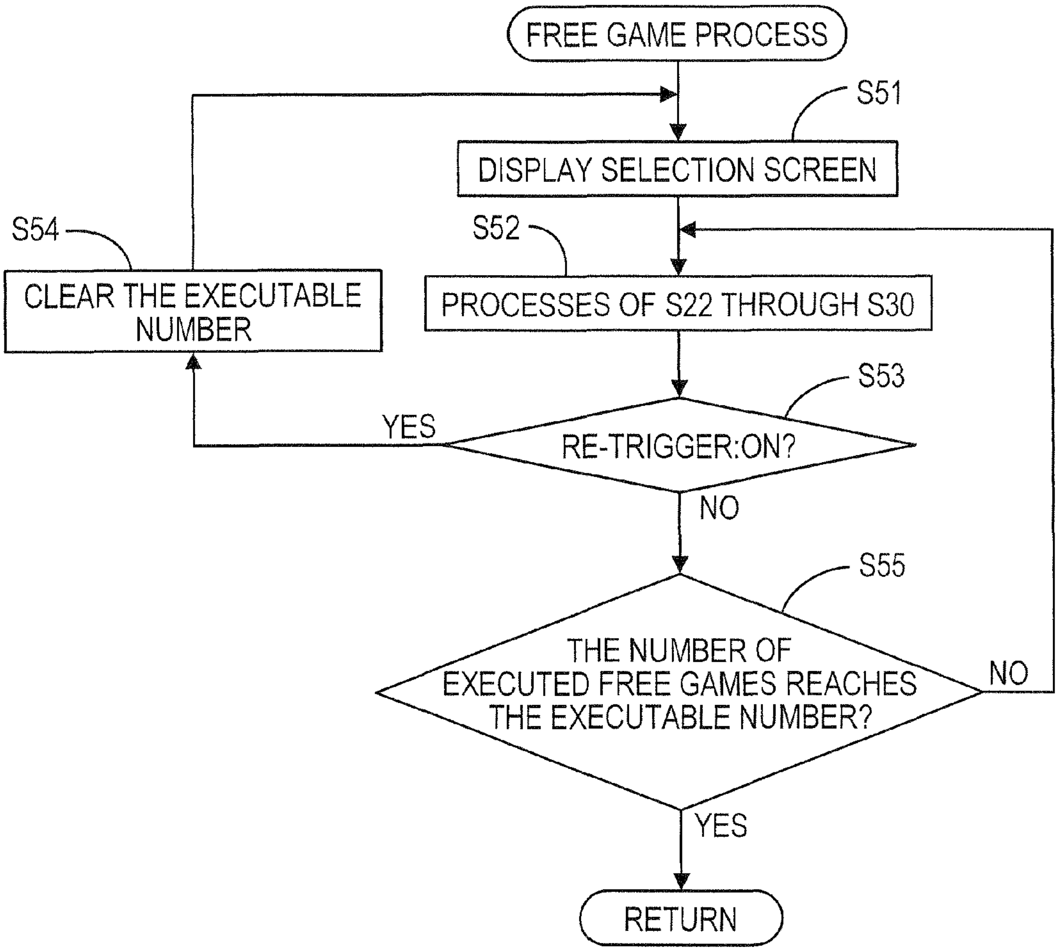
FIG. 29 is a flowchart of the free game process in the slot machine in accordance with one or more aspects of the invention.

FIG. 29 shows a flowchart of the free game process of the third embodiment.

At S51, a selection screen is displayed. Since the selection screen is the same as FIG. 20, explanation thereof will be omitted.

At S52, the processes of S22 through S30 of FIG. 18 are executed. Since these processes are the same as the processes of the first embodiment, explanation thereof will be omitted.

At S53, it is determined whether or not the re-trigger is ON. In the embodiment, if three or more of the Dracula symbol symbols 51F, it is determined "YES" at S53. FIG. 17 shows the condition where three of the DRACULA symbols 51F are displayed.

If it is determined "YES" at S53 (S53:YES), the procedure will be shifted to S54. On the other hand, if it is determined that three or more of the DRACULA symbols 51F are not displayed (S53:NO), the procedure will be shifted to S55.

At S54, the executable number is cleared. After that, the procedure will be returned to S51.

At S55, it is determined whether or not the number of executed free games reaches the executable number. If it is determined that the number of executed free games does not the executable number (S55:NO), the procedure will be returned to S52. On the other hand, if it is determined that the number of executed free games reaches the executable number (S55:YES), the free game is terminated.

As mentioned above, in the third embodiment of one or more aspects of the invention, specific area is selectable and if a specific symbol is stopped on the selected specific area in a free game, additional payout amount is provided based on the number of stopped specific symbols and additional amount. Also, the additional amount is determined from a predetermined additional amount group by lottery. Also, the predetermined additional amount group is determined from among plural additional amount group. Herewith, since the free game can be executed according to player's taste, the entertainment aspect is enhanced and it can attract players.

Also, if three or more of the DRACULA symbols 51F are stopped, the re-trigger is ON and free games are newly executed, hence, the number of games to be executed is increased. Herewith, the entertainment aspect is enhanced and it can attract players.

Here, one or more aspects of the invention is not limited to above embodiments and various changes and modifications can be done within the scope of the invention certainly.

Figure 30:
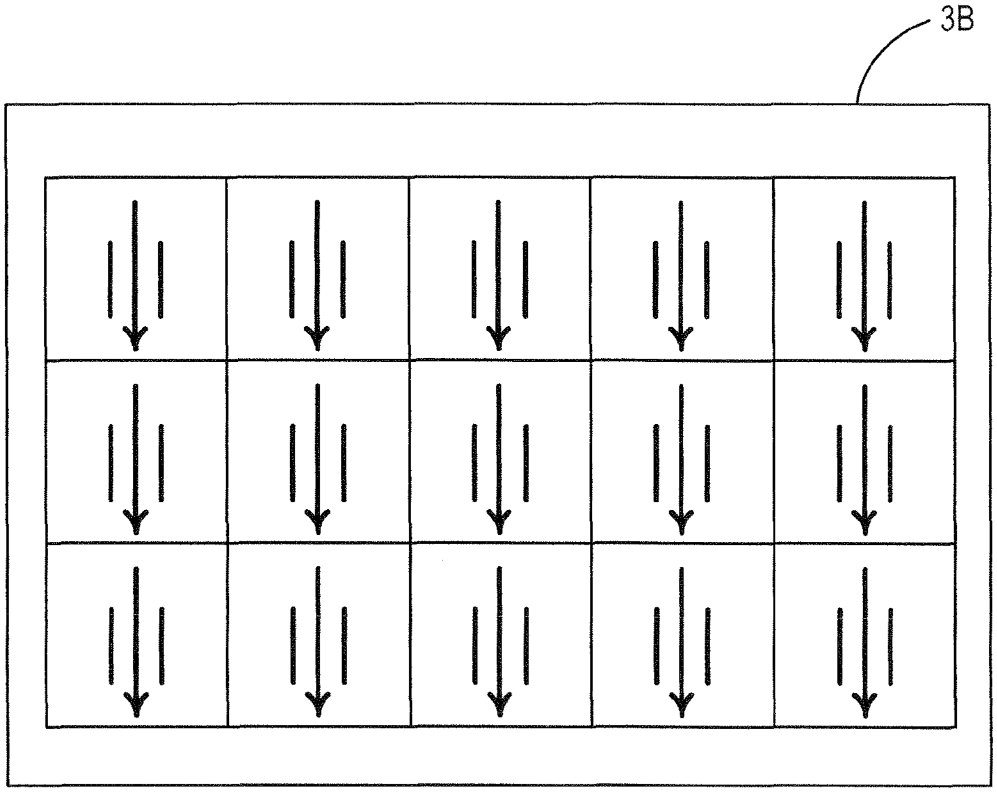
FIG. 30 is a view showing a condition where reels are variably displayed on variably display portions of the slot machine in accordance with one or more aspects of the invention.

For example, in one or more aspects of the invention, reels may be variably displayed on each of the symbol display portions (see FIG. 30). In this time, if the reel stopped, one symbol is stopped on the symbol display portion. Also, each of the symbol display portions corresponding to one reel. In this case, a second lottery program may be used. The second lottery program is a program to determine code numbers corresponding to symbols to be stopped in each of symbol display portions of the main display portion 3B. A correspondence relationship between code numbers and symbols can be the same as the first embodiment or can not be different.

Also, one or more aspects of the invention can be implemented as a playing method to execute above processes. Further, one or more aspects of the invention can be implemented as a program to execute above processes in one or more computers, and a tangible medium in which the program is stored.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A gaming machine comprising:
- a display that displays a plurality of symbol display areas, each of the symbol display areas displaying a symbol;
- user interface elements that accept input information from a user;
- a memory configured to store a plurality of selectable area patterns to each of which a plurality of additional amounts are assigned, each selectable area pattern including a different subset of the symbol display areas; and a processor that controls display contents of the display and a game session, the game session including a first game and a second game;

wherein the processor is programmed to:

(a) display a selection screen on the display if a predetermined number or more of first symbols are displayed in the first game, on the selection screen the plurality of selectable area patterns being displayed and the plurality of additional amounts being displayed corresponding to each of the plurality of selectable area patterns with reference to the memory, (b) select one area pattern among the plurality of selectable area patterns based on the input information from the user interface elements, (c) execute the second game a predetermined number of times, (d) determine an additional payout amount based on a number of second symbols displayed on the subset of symbol display areas included in the one area pattern selected in the process (b) during the predetermined number of second games and one additional amount which is determined by lottery among the plurality of additional amounts corresponding to the one selected area pattern, with reference to the memory, and (e) provide the additional payout amount determined in the process (d).

2. The gaming machine according to claim 1, wherein the user interface elements are arranged in front of the display.

3. A gaming machine comprising:

a display that displays a plurality of symbol display areas, each of the symbol display areas displaying a symbol;

user interface elements that accept input information from a user;

a memory configured to store a plurality of selectable area patterns to each of which a plurality of additional amounts are assigned, each selectable area pattern including a different subset of the symbol display areas; and a processor that controls display contents of the display and a game session, the game session including a first game and a second game;

wherein the processor is programmed to:

(a) display a selection screen on the display if a predetermined number or more of first symbols are displayed in the first game, on the selection screen the plurality of selectable area patterns being displayed and the plurality of additional amounts being displayed corresponding to each of the plurality of selectable area patterns with reference to the memory, (b) select one area pattern among the plurality of selectable area patterns based on the input information from the user interface elements, (c) execute the second game a predetermined number of times, (d) determine an additional amount from the plurality of additional amounts assigned to the one area pattern by lottery for each execution of the second game, (e) determine an additional payout amount based on a number of second symbols displayed on the subset of symbol display areas included in the one area pattern selected in the process (b) during each execution of the second game and the additional amount determined in the process (d), and (f) provide the additional payout amount determined in the process (e).

4. The gaming machine according to claim 3, wherein the user interface elements are arranged in front of the display.

5. A gaming machine comprising:

a display that displays a plurality of symbol display areas, each of the symbol display areas displaying a symbol;

user interface elements that accept input information from a user;

a memory configured to store a plurality of selectable area patterns to each of which a plurality of additional amounts are assigned, each selectable area pattern including a different subset of the symbol display areas; and a processor that controls display contents of the display and a game session, the game session including a first game and a second game;

wherein the processor is programmed to:

(a) display a selection screen on the display if a predetermined number or more of first symbols are displayed in the first game, on the selection screen the plurality of selectable area patterns being displayed and the plurality of additional amounts being displayed corresponding to each of the plurality of selectable are patterns with reference to the memory, (b) select one area pattern among the plurality of selectable area patterns based on the input information from the user interface elements, (c) determine one additional amount group including the plurality of additional amounts, the additional amount group being assigned to the one area pattern selected in the process (b), with reference to the memory, (d) execute the second game a predetermined number of times, (e) determine an additional amount from the plurality of additional amounts belonging to the one additional amount group and assigned to the one area pattern by lottery for each execution of the second game, (f) determine an additional payout amount based on a number of second symbols displayed on the subset of symbol display areas included in the one area pattern selected in the process (b) during each execution of the second game and the additional amount determined in the process (e), and (g) provide the additional payout amount determined in the process (f).

6. The gaming machine according to claim 5, wherein the user interface elements are arranged in front of the display.

* * * * *